(12) United States Patent  
Ozaki et al.

(10) Patent No.: US 8,167,497 B2  
(45) Date of Patent: *May 1, 2012

(54) SENSOR-EQUIPPED BEARING FOR WHEEL

(75) Inventors: Takayoshi Ozaki, Iwata (JP); Tomomi Ishikawa, Iwata (JP); Kentarou Nishikawa, Iwata (JP)

(73) Assignee: NTN Corporation, Osaka (JP)

( * ) Notice: Subject to any disclaimer, the term of this patent is extended or adjusted under 35 U.S.C. 154(b) by 981 days.

This patent is subject to a terminal disclaimer.

(21) Appl. No.: 11/990,071

(22) PCT Filed: Aug. 1, 2006

(86) PCT No.: PCT/JP2006/315192  
§ 371 (c)(1),  
(2), (4) Date: Feb. 6, 2008

(87) PCT Pub. No.: WO2007/018072  
PCT Pub. Date: Feb. 15, 2007

(65) Prior Publication Data  
US 2010/0135604 A1 Jun. 3, 2010

(51) Int. Cl.  
*F16C 41/00* (2006.01)

(52) U.S. Cl. ............. 384/448; 384/544; 73/115.07

(58) Field of Classification Search .......... 384/448, 384/544; 73/115.07, 117.01  
See application file for complete search history.

(56) References Cited

U.S. PATENT DOCUMENTS

| | | | |
|---|---|---|---|
| 4,341,122 A | 7/1982 | Lechler et al. | |
| 6,535,135 B1 * | 3/2003 | French et al. | 340/682 |
| 6,634,208 B2 * | 10/2003 | Salou et al. | 73/11.07 |
| 6,920,801 B2 | 7/2005 | Van Leeuwen et al. | |
| 6,971,799 B2 | 12/2005 | Sato et al. | |
| 7,178,413 B2 | 2/2007 | Hoffmann et al. | |
| 7,249,528 B2 | 7/2007 | Inoue | |
| 7,604,413 B2 | 10/2009 | Koike et al. | |
| 7,628,540 B2 | 12/2009 | Iwamoto et al. | |
| 7,631,553 B2 | 12/2009 | Heim et al. | |
| 7,661,320 B2 | 2/2010 | Duret et al. | |
| 2002/0012484 A1 | 1/2002 | Salou et al. | |
| 2002/0061148 A1 | 5/2002 | Salou et al. | |
| 2002/0097040 A1 | 7/2002 | Takizawa et al. | |
| 2003/0218548 A1 | 11/2003 | Sato et al. | |

(Continued)

FOREIGN PATENT DOCUMENTS

JP 55-132926 10/1980

(Continued)

OTHER PUBLICATIONS

International Search Report (PCT/ISA/210) mailed on Oct. 24, 2006 in connection with the International Application No. PCT/JP2006/315192.

(Continued)

*Primary Examiner* — William C Joyce

(57) ABSTRACT

A sensor-equipped bearing for a wheel rotatably supporting the wheel relative to a vehicle body includes an outer member (1) provided with a double-row raceway surface (3) on an inner periphery thereof, an inner member (2) provided with raceway surfaces (4) opposing to the raceway surfaces (3) of the outer member (1), one of the outer and inner members serving as a stationary member, double-row rolling elements (5) interposed between the outer and inner raceway surfaces, a sensor fitting member (22) fixed to a peripheral surface of the stationary member, and a plurality of strain sensors (23) attached to the sensor fitting member (22) for measuring a strain thereof.

8 Claims, 28 Drawing Sheets

U.S. PATENT DOCUMENTS

| | | |
|---|---|---|
| 2004/0031311 A1 | 2/2004 | Meyer et al. |
| 2005/0016296 A1 | 1/2005 | Inoue |
| 2007/0157742 A1 | 7/2007 | Kouduki et al. |
| 2009/0038414 A1 | 2/2009 | Ozaki et al. |
| 2009/0044633 A1 | 2/2009 | Duret et al. |
| 2009/0080822 A1 | 3/2009 | Ozaki et al. |
| 2009/0097791 A1 | 4/2009 | Ozaki et al. |
| 2009/0129712 A1 | 5/2009 | Ozaki et al. |
| 2009/0199660 A1 | 8/2009 | Ozaki et al. |
| 2009/0229379 A1 | 9/2009 | Ozaki et al. |
| 2009/0301222 A1 | 12/2009 | Takahashi et al. |
| 2009/0324152 A1 | 12/2009 | Ozaki et al. |
| 2010/0046871 A1 | 2/2010 | Norimatsu et al. |
| 2010/0129016 A1 | 5/2010 | Isobe et al. |
| 2010/0129017 A1 | 5/2010 | Isobe et al. |

FOREIGN PATENT DOCUMENTS

| | | |
|---|---|---|
| JP | 55-156608 | 12/1980 |
| JP | 59-163531 | 9/1984 |
| JP | 63-256832 | 10/1988 |
| JP | 6-32735 | 4/1994 |
| JP | 9-61268 | 3/1997 |
| JP | 2002-98138 | 4/2002 |
| JP | 2002-340922 | 11/2002 |
| JP | 2003-166888 | 6/2003 |
| JP | 2003-172347 | 6/2003 |
| JP | 2003-530565 | 10/2003 |
| JP | 2003-336653 | 11/2003 |
| JP | 2004-3601 | 1/2004 |
| JP | 2004-142577 | 5/2004 |
| JP | 2004-183684 | 7/2004 |
| JP | 2005-502892 | 1/2005 |
| JP | 2005-37298 | 2/2005 |
| JP | 2005-77236 | 3/2005 |
| JP | 2006-77807 | 3/2006 |
| JP | 2007-57258 | 3/2007 |
| JP | 2007-57259 | 3/2007 |
| JP | 2007-57302 | 3/2007 |
| JP | 2007-71280 | 3/2007 |
| JP | 2007-78615 | 3/2007 |
| JP | 2007-155079 | 6/2007 |
| JP | 2007-155629 | 6/2007 |
| WO | 01/77634 | 10/2001 |
| WO | 2007/054639 A1 | 5/2007 |

OTHER PUBLICATIONS

International Preliminary Report, mailed on Feb. 21, 2008 and issued in corresponding Japanese Patent Application No. PCT/JP2006/315192.

Chinese Office Action issued Jun. 14, 2011 in corresponding Chinese Patent Application 200680028967.4.

Japanese Notification for Reason(s) for Rejection issued Aug. 23, 2011 in related Japanese Patent Application 2005-229211.

Japanese Office Action issued on Jun. 7, 2011 in related Japanese Patent Application 2005-240908.

Japanese Office Action issued on Jun. 7, 2011 in related Japanese Patent Application 2005-240909.

Chinese Office Action issued Mar. 24, 2011 in a related Chinese Patent Application 200880101293.5.

Japanese Office action issued May 17, 2011 in a corresponding Japanese Patent Application 2005-250576.

U.S. Appl. No. 12/452,909, filed Jan. 28, 2010, Hiroshi Isobe, NTN Corporation.

U.S. Appl. No. 12/452,908, filed Jan. 28, 2010, Hiroshi Isobe, NTN Corporation.

European Search Report dated Feb. 24, 2012 issued in corresponding European Patent Application No. 08790294.6.

\* cited by examiner

SENSOR-EQUIPPED BEARING FOR WHEEL

CROSS REFERENCE TO RELATED APPLICATIONS

This application claims the benefit under 35 U.S.C. Section 371, of PCT International Application Number PCT/JP2006/315192 filed on Aug. 1, 2006, and also the following Japanese Applications:

2005-229211 filed on Aug. 8, 2005;
2005-240908 filed on Aug. 23, 2005;
2005-240909 filed on Aug. 23, 2005;
2005-240910 filed on Aug. 23, 2005;
2005-240911 filed on Aug. 23, 2005;
2005-240912 filed on Aug. 23, 2005;
2005-250576 filed on Aug. 31, 2005; and
2005-250577 filed on Aug. 31, 2005 in Japan, the contents of which are incorporated herein by reference.

FIELD OF THE INVENTION

The present invention relates to a sensor-equipped bearing for a wheel having a built-in load sensor to detect a load applied to a bearing portion of a wheel.

BACKGROUND OF THE INVENTION

Conventionally, there has been a structure in which a sensor detecting a rotating speed of each of wheels is provided in a bearing, for a safety drive of a motor vehicle. A conventional general countermeasure for securing a traveling safety of the motor vehicle is taken by detecting a rotating speed of the wheel, however, there is demanded to achieve a further control for a safety by using additional sensor signals other than speed sensor signals because only the rotating speed of the wheel is not sufficient.

Accordingly, there can be considered to achieve a posture control based on the load applied to each of the wheels during travel of the vehicle, since the load applied to each of the wheels is not uniform. For example, a great load is applied to the outside wheels in a cornering, the load is biased to the one side wheels during travel on a lateral slope surface, and the load is biased to the front wheels at a time of braking. Further, in the case that a superimposed load is uneven, the applied load becomes uneven. Accordingly, if it is possible to detect the load applied to the wheels any appropriate timing, it is possible to carry out a posture control at a time when the vehicle travels (a rolling prevention at a time of cornering, a front wheel sinking prevention at a time of braking, a sinking prevention caused by an unevenness of the superimposed load or the like) by controlling a suspension or the like in advance on the basis of results of detection. However, since there is no suitable installing place for a sensor detecting the load applied to the wheel, it is hard to achieve the posture control on the basis of the load detection.

Also, in the event that in the future the steer-by-wire is introduced to provide a system in which an axle and a steering wheel come not to be mechanically coupled, it will be demanded to detect a load acting in an axial direction of the wheel so as to transmit information on the road surface to the steering wheel held by a driver.

In order to meet the demand mentioned above, there has been proposed a bearing for a wheel with a strain gauge attached to an outer race of the bearing for the wheel so as to detect the strain acting on the outer race, for example, in Japanese Laid-open Patent Publication No. 2003-530565.

The outer race of the bearing for the wheel has at least one rolling contact surface and therefore should have a sufficient strength. Also, since it is manufactured through a complicated process such as plastic working, turning, heat treatment and grinding, the structure in which the strain gauge is attached to the outer race as shown in the publication mentioned above, lead to a low productivity and a high cost in case of mass production.

In order to solve the above problem, it was attempted to attach a strain sensor to a sensor fitting member so as to form a sensor unit, and to attach the sensor unit to the outer race. In this case, if it costs too much to manufacture the sensor fitting member, it is impossible to achieve a cost reduction. Accordingly, it is desired to achieve the cost reduction at a time of mass production by making the sensor fitting member be easily worked.

Further, if the strain gauge is attached to the outer race so as to be exposed as described in the above publication, the strain gauge is often exposed to a corrosive gas or a corrosive liquid, and as a result, the strain gauge is corroded, thereby failing to carry out an accurate sensing. The bearing for the wheel is generally under a severe condition that it is exposed to a road surface and comes under a salty muddy water. Even in the case that the strain gauge is provided in a sealed bearing space, the corrosive gas or the corrosive liquid occasionally intrudes thereto and accordingly, it is impossible to completely prevent the corrosion of the strain gauge.

Further, an output signal of the load detecting sensor such as the strain gauge is transmitted, for example, to a sensor signal processing circuit provided in an electric control unit of a motor vehicle so as to be utilized for calculating an external force acting on the bearing for the wheel and an acting force between a tire and the road surface or the like as well as for controlling the motor vehicle. However, conventionally a wiring connecting between the load detecting sensor and the sensor signal processing circuit is complicated with the consequence of no-easy wiring work.

SUMMARY OF THE INVENTION

A main object of the present invention is to provide a sensor-equipped bearing for a wheel in which a sensor for detecting a load can be installed compactly in a vehicle, in which a load acting on the wheel can be detected, and in which a cost during the mass production can be reduce. An additional object of the present invention is to provide the sensor-equipped bearing in which the sensor for detecting load can be protected from eroding so as to achieve high reliability, and in which a wiring connecting the sensor and a sensor signal processing circuit can be simplified.

A sensor-equipped bearing for a wheel of the present invention rotatably supporting the wheel relative to a vehicle body includes an outer member provided with a double-row raceway surface on an inner periphery thereof, an inner member provided with raceway surfaces opposing to the raceway surfaces of the outer member, one of the outer and inner members serving as a stationary member, double-row rolling elements interposed between the outer and inner raceway surfaces, a sensor fitting member fixed to a peripheral surface of the stationary member, and a plurality of strain sensors attached to the sensor fitting member for measuring a strain thereof.

With a load applied to a rotatable member during a vehicle travel, the stationary member is deformed due to the load transmitted thereto via the rolling elements, and the deformation causes a strain of the sensor fitting member. The strain sensor provided at the sensor fitting member detects the strain thereof. If a relation between the strain and the load is predetermined by means of an experiment and a simulation, the load or the like acting on the wheel can be detected by the output of the strain sensor. In other words, an external force applied to the bearing for the wheel, an acting force between the tire and the road surface or a precompression of the bearing for the wheel can be estimated on the basis of the output of the strain sensor. Further, the load or the like can be used for a vehicle control.

Since, according to the sensor-equipped bearing for the wheel, the strain sensor is attached to the sensor fitting member such as the ring-shaped member mounted on the peripheral surface of the stationary member, the load sensor can be installed compactly in the vehicle. Since the sensor fitting member is attached to the stationary member, the sensor fitting member can be formed by a simple part and therefore, a sensor unit including the sensor fitting member and the strain sensor can be made excellent in mass production by attaching the strain sensor to such compact sensor fitting member, accompanied by a cost reduction.

In the present invention, the stationary member is provided with a sensor unit having the sensor fitting member and the strain sensor attached thereto, the sensor fitting member having at least two contact fixing portions fixed to the stationary member and at least one cut-off portion between the neighboring contact fixing portions, the strain sensor being attached to the cut-off portion.

Since the sensor fitting member has the cut-off portion between the neighboring contact fixing portions and the strain sensor is attached to the cut-off portion, the cut-off portion in the sensor fitting member generates a strain greater than that generated in the stationary member due to a reduction of its rigidity, and as a result, the strain of the stationary member can be sensitively detected.

In the present invention, the stationary member is provided with a weakened portion in the vicinity of an end portion thereof and wherein a sensor unit having the sensor fitting member and the strain sensor is attached to the weakened portion, the sensor fitting member having at least two contact fixing portions fixed to the stationary member and at least one cut-off portion between the neighboring contact fixing portions, the strain sensor being attached to the cut-off portion.

Generally, the bearing for the wheel has a high rigidity for securing a wheel support performance thereof. For this reason, the strain of the stationary member is small, and as a result, it tends to be difficult to detect the acting force between the tire and the road surface by the sensor unit. According to the present invention, in which the sensor unit is fitted to the stationary member at the weakened portion, having the low rigidity, provided in the vicinity of the end portion thereof, the strain of the sensor fitting member becomes large relative to that of the stationary member. As a result, a small strain of the stationary member can be detected by the sensor unit. Since the weakened portion is provided near the end portion of the stationary member which has no effect on the tire support, any lowering of the rigidity of this portion does not affect the tire support.

Further, since the sensor fitting member has the cut-off portion between the neighboring contact fixing portions and the strain sensor is attached to the cut-off portion, the cut-off portion in the sensor fitting member generates a strain greater than that generated in the stationary member due to a reduction of its rigidity, and as a result, the strain of the stationary member can be sensitively detected.

In the present invention, the stationary member is provided with a sensor unit having the sensor fitting member and the strain sensor attached thereto, the sensor fitting member having at least two contact fixing portions fixed to the stationary member and at least one cut-off portion between the neighboring contact fixing portions, the strain sensor being attached to the cut-off portion and a portion between the contact fixing portions of the sensor fitting member includes two flat plates parallel to each other and a circular arc plate connecting the flat plates together, each flat plate having the cut-off portion.

Since the sensor fitting member has the cut-off portion between the neighboring contact fixing portions and the strain sensor is attached to the cut-off portion, the one portion in the sensor fitting member generates a strain greater than that generated in the stationary member due to a reduction of its rigidity, and as a result, the strain of the stationary member can be sensitively detected.

The construction of the sensor fitting member described above, that is, the construction having at least two contact fixing portions fixed to the stationary member and at least one cut-off portion between the neighboring contact fixing portions can be easily obtained by a combination of the two parallel flat plates each having the cut-off portion formed therein with the circular arc plate connecting the flat plates to each other so as to define a C-shaped cross sectional shape. According to the sensor fitting member so formed as mentioned above, since the portion other than the cut-off portion is formed as the C-shaped cross sectional shape, the sensor fitting member can be easily manufactured to define a shape such that the rigidity of the cut-off portion is lowered so as to generate a great strain while enhancing the whole rigidity. In addition, since it can be manufactured light in weight, a weight balance of the bearing for the wheel is not adversely affected when the sensor fitting member is fixed to the bearing. The flat plate and the circular arc plate can be easily and inexpensively manufactured by a press work of a steel plate. In the case of connecting two parallel flat plates and the circular arc plate which are separately prepared, two parallel flat plates and the circular arc plate may be bonded by any means, for example, a welding or a brazing.

In the present invention, the stationary member is provided with a sensor unit having the sensor fitting member and the strain sensor attached thereto, the sensor unit being attached to a surface of the stationary member, which surface confronts the other of the outer and inner members and wherein the sensor unit is provided with a sacrificial anode.

According to the sensor unit described above, an annular bearing space between the outer and inner members, which space is in general sealed by a sealing device, the sensor unit is normally not exposed to a corrosive gas or a corrosive liquid. However, under an adverse condition, the corrosive gas or the corrosive liquid intrudes into the annular bearing space. In this case, the sacrificial anode having the electrochemically higher ionization tendency than the sensor fitting member, the strain sensor or the bearing components preferentially reacts with the corrosive gas or corrosive liquid intruding into the annular bearing space, thereby preventing the surrounding parts from being ionized, that is, being eluted. As a result, corrosion of the strain sensor and the sensor fitting member can be prevented.

In the present invention, the stationary member is provided with a sensor unit having the sensor fitting member and the strain sensor attached thereto, the sensor fitting member having at least two contact fixing portions fixed to the stationary member and at least one cut-off portion between the neighboring contact fixing portions, the strain sensor being attached to the cut-off portion. and a sensor signal processing circuit unit having a sensor signal processing circuit for processing an output signal of the strain sensor is provided on the stationary member in the vicinity of the sensor unit.

Since the sensor fitting member has the cut-off portion between the neighboring contact fixing portions and the strain sensor is attached to the cut-off portion, the cut-off portion in the sensor fitting member generates a strain greater than that generated in the stationary member due to a reduction of its rigidity, and as a result, the strain of the stationary member can be sensitively detected.

Also, since the sensor signal processing circuit unit is provided near the sensor unit, a wiring connecting the strain sensor and the sensor signal processing circuit is simplified, thereby facilitating wiring work, and further, a whole detecting system can be downsized in comparison with the case that the sensor signal processing circuit is provided in a position other than the bearing.

In the present invention, the stationary member is provided with a sensor unit having the sensor fitting member and the strain sensor attached thereto, the sensor fitting member having at least two contact fixing portions fixed to the stationary member and at least one cut-off portion between the neighboring contact fixing portions, the strain sensor being attached to the cut-off portion and a sensor signal processing circuit unit for processing an output signal of the strain sensor is provided on the stationary member in the vicinity of the sensor unit, the sensor signal processing circuit unit having at least one of an acceleration sensor, a vibration sensor and a water ingredients detecting sensor.

Since the sensor fitting member has the cut-off portion between the neighboring contact fixing portions and the strain sensor is attached to the cut-off portion, the one portion in the sensor fitting member generates a strain greater than that generated in the stationary member due to a reduction of its rigidity, and as a result, the strain of the stationary member can be sensitively detected.

Also, a state of the bearing is detected by at least one sensor of the various sensors, that is, the acceleration sensor, the vibration sensor and the water ingredients detecting sensor provided in the sensor signal processing circuit unit. The output signal of the various sensors is processed by the sensor signal processing circuit unit as occasion demands. Further, such output signal is used for the vehicle control together with the load or the like detected by the strain sensor.

According to the sensor-equipped bearing, since the strain sensor and the various sensors are attached to the respective sensor fitting member and the sensor signal processing circuit, attached to the stationary member, the strain sensor and the various sensors can compactly be installed in the vehicle. Since both of the sensor fitting member and the sensor signal processing circuit unit are made of the simple parts, respectively, excellent mass productivity and cost reduction of the sensor-equipped bearing can be attained by attaching the strain sensor and the various sensors (at least one of the acceleration sensor, the vibration sensor and the water ingredients detecting sensor) to the sensor fitting member and the sensor signal processing circuit unit, respectively.

Since the sensor signal processing circuit unit is provided near the sensor unit, a wiring connecting the strain sensor and the sensor signal processing circuit is simplified, thereby facilitating wiring work. Also, since the various sensors for detecting the state of the bearing (at least one of the acceleration sensor, the vibration sensor and the water ingredients detecting sensor) is attached to the sensor signal processing circuit unit, the wiring connecting the various sensors and the sensor signal processing circuit unit can be dispensed. Further, the load and the state of the bearing can be detected at one position by installing the various sensors (the acceleration sensor, the vibration sensor and the water ingredients detecting sensor) in the sensor signal processing circuit unit. Accordingly, a whole detecting system can be downsized and further, wiring work can be facilitated in comparison with the case that the sensor signal processing circuit is provided in a position other than the bearing.

Further, in the present invention, the stationary member is provided with a sensor unit having the sensor fitting member and the strain sensor attached thereto, the sensor fitting member having at least two contact fixing portions fixed to the stationary member and at least one cut-off portion between the neighboring contact fixing portions, the strain sensor being attached to the cut-off portion and a sensor signal processing circuit unit for processing an output signal of the strain sensor is provided on the stationary member in the vicinity of the sensor unit, the sensor signal processing circuit unit having a magnetic sensor and wherein a to-be-detected portion made of magnetic material for detecting a rotation is provided on the other member of the outer and inner members serving as a rotational member at a position confronting the magnetic sensor.

Since the sensor fitting member has the cut-off portion between the neighboring contact fixing portions and the strain sensor is attached to the cut-off portion, the one portion in the sensor fitting member generates a strain greater than that generated in the stationary member due to a reduction of its rigidity, and as a result, the strain of the stationary member can be sensitively detected.

Further, when the rotatable member is rotated with respect to the stationary member, the to-be-to-be-detected portion provided in the rotatable member is relatively moved in a circumferential direction with the magnetic sensor provided in the stationary member, whereby the magnetic sensor outputs as an output signal a pulse or the like. The rotation of the wheel can be detected by processing the output signal of the magnetic sensor in the sensor signal processing circuit unit.

The load or the like applied to the wheel and the rotation of the wheel, detected as mentioned above, can be used for the vehicle control.

According to the sensor-equipped bearing, since the strain sensor and the magnetic sensor are attached to the respective sensor fitting member and the sensor signal processing circuit, attached to the stationary member, the strain sensor and the magnetic sensor can compactly be installed in the vehicle. The load and the rotation of the bearing can be detected at one position by installing the magnetic sensor in the sensor signal processing circuit unit. Since both of the sensor fitting member and the sensor signal processing circuit unit are made of the simple parts, respectively, excellent mass productivity and cost reduction of the sensor-equipped bearing can be attained by attaching the strain sensor and the magnetic sensor to the sensor fitting member and the sensor signal processing circuit unit, respectively.

Since the sensor signal processing circuit unit is provided near the sensor unit, a wiring connecting the strain sensor and the sensor signal processing circuit is simplified, thereby facilitating wiring work. Further, since the magnetic sensor is attached to the sensor signal processing circuit unit, the wiring connecting the magnetic sensor and the sensor signal processing circuit unit can be dispensed. Accordingly, a whole detecting system can be downsized and further, wiring work can be facilitated in comparison with the case that the sensor signal processing circuit is provided in a position other than the bearing.

BRIEF DESCRIPTION OF THE DRAWINGS

In any event, the present invention will become more clearly understood from the following description of a preferred embodiment thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

DESCRIPTION OF THE PREFERRED EMBODIMENT

Figure 1:
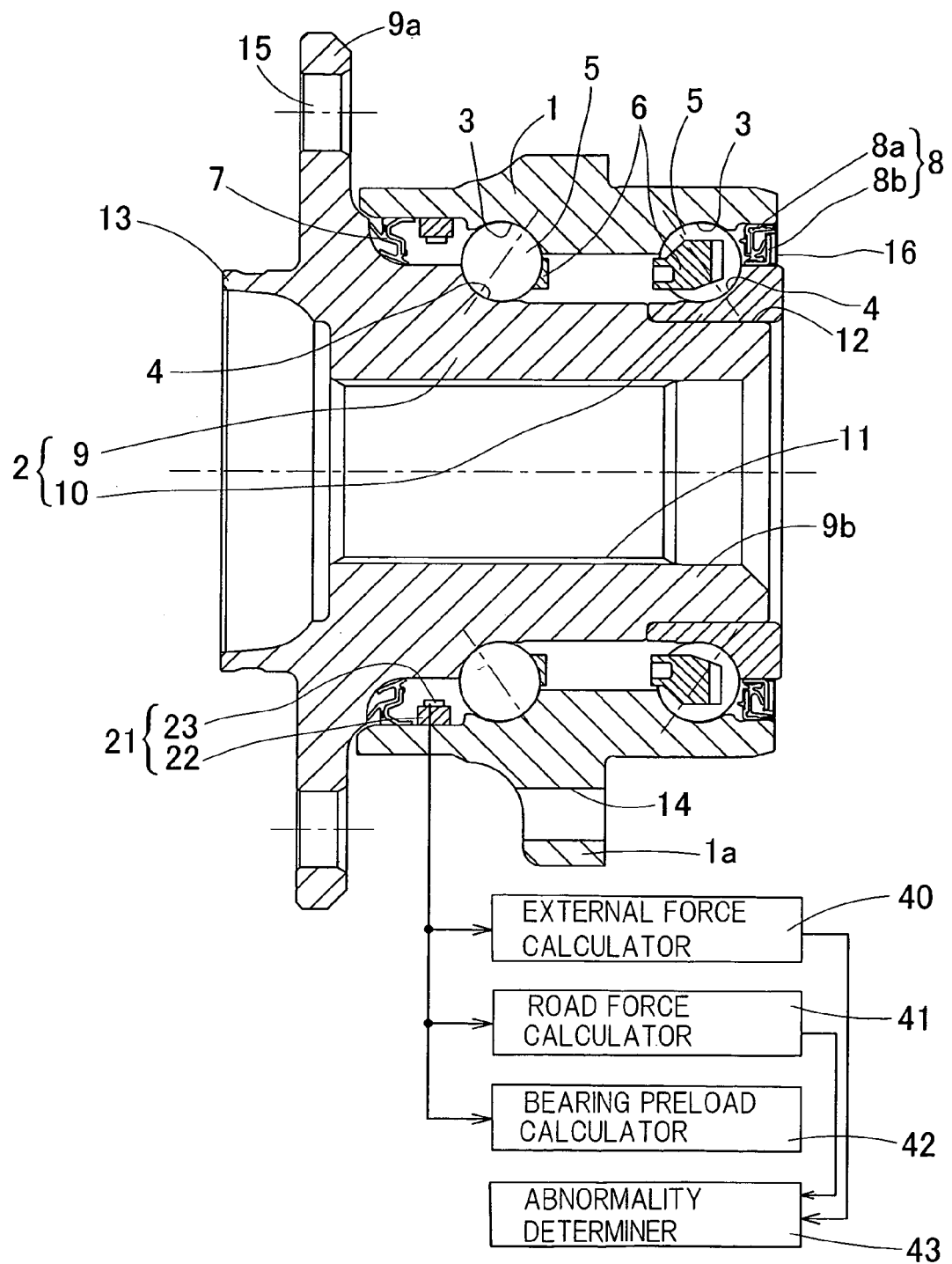
FIG. 1 is a cross sectional view of a sensor-equipped bearing with a block diagram of a detecting system for a wheel in accordance with a first embodiment of the present invention.
Figure 2:
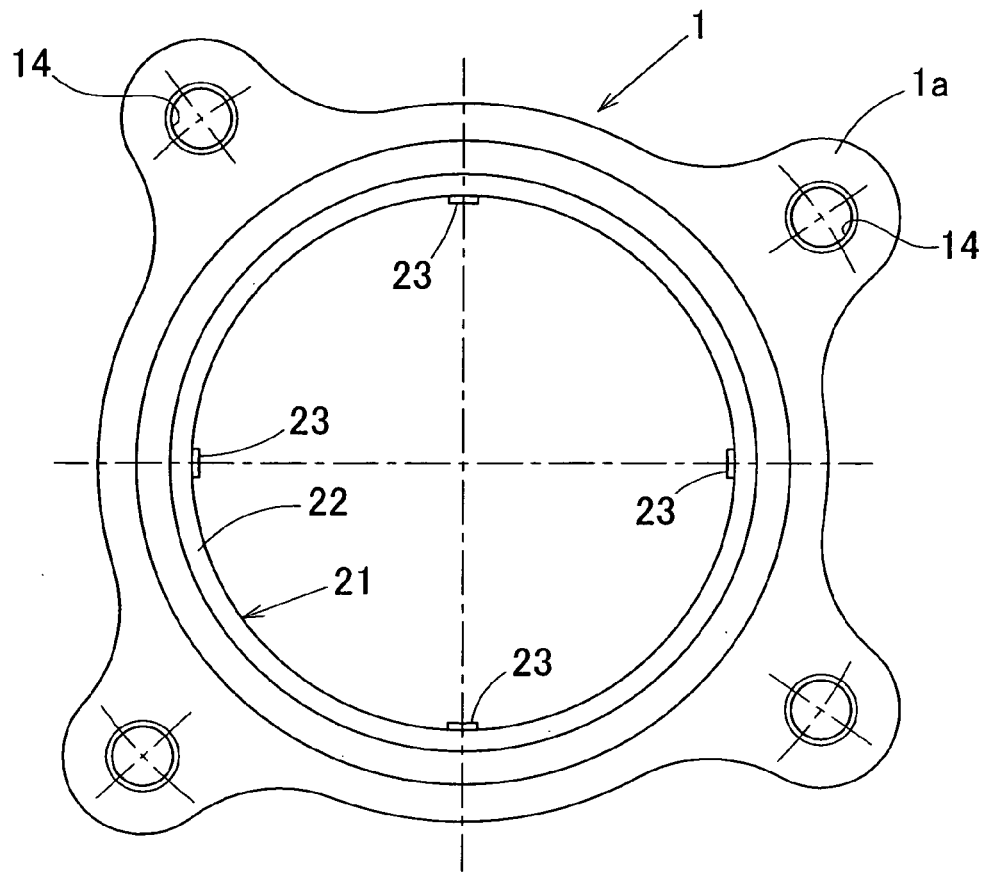
FIG. 2 is a front elevational view showing an outer member and a sensor unit of the sensor-equipped bearing.
Figure 3:
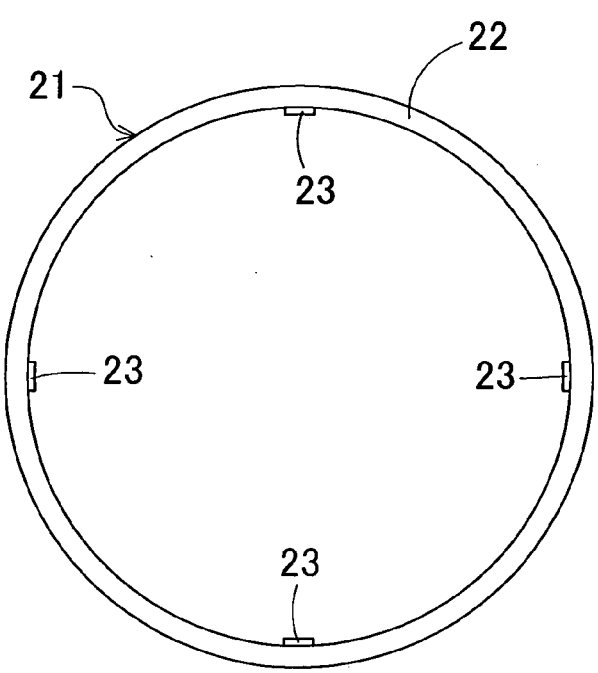
FIG. 3 is a front elevational view of the sensor unit.

A description will be given of a first embodiment in accordance with the present invention with reference to FIGS. 1 to 3. The first embodiment is an inner race rotating type of a third generation model, and is applied to a bearing for a wheel for supporting drive wheels. It is to be noted that in this specification hereinafter terms "outboard" and "inboard" represent one side of the vehicle away from the longitudinal center of the vehicle body and the other side of the vehicle body close to the longitudinal center of the vehicle body, respectively. In FIG. 1, a left portion represents the inboard side whereas a right portion represents the inboard side.

A sensor-equipped bearing for a wheel includes an outer member 1 having double-row raceway surfaces 3 on an inner periphery thereof, an inner member 2 having a raceway surfaces 4 opposing to each of the raceway surfaces 3, and double-row rolling elements 5 interposed between the raceway surfaces 3 and 4 of the outer member 1 and the inner member 2, respectively. This bearing is in the form of a double-row angular contact ball bearing. The rolling element 5 is formed by a ball, and is retained by a retainer 6 per each of the rows. Each of the raceway surfaces 3 and 4 represents an arcuate shape in section, and is formed such that an angle of contact is outwardly directed. Opposite ends of an annular bearing space between the outer member 1 and the inner member 2 are sealed by sealing devices 7 and 8, respectively.

The outer member 1 serving as a stationary member, has a flange 1a to be attached to a knuckle in a suspension apparatus (not shown) of a vehicle body in an outer periphery thereof, and is formed integrally to define an unitary part. The flange 1a is provided with a plurality of circumferentially spaced vehicle body fitting holes 14.

The inner member 2 serving as a rotatable member, is made up of a hub axle 9 having a hub flange 9a for mounting a wheel and a separate inner race 10 mounted fixedly on an outer periphery of an inboard end of a axle portion 9b of the hub axle 9. The raceway surfaces 4 in each of the rows are formed in the hub axle 9 and the inner race 10. A portion of the outer periphery surface at the inboard end of the hub axle 9 is radically inwardly stepped or decreased in diameter to define an inner race mounting area 12 and the inner race 10 is mounted on the inner race mounting surface 12. The hub axle 9 has a center bore 11 define therein. The hub flange 9a is provided with a plurality of press-fitting holes 15 for a hub mounting bolt (not shown) on an outer peripheral surface. A cylindrical pilot portion 13 for guiding a wheel and a braking part (not shown) is protruded to an outboard side in the vicinity of a root portion of the hub flange 9a of the hub axle 9.

A sensor unit 21 is provided in an inner periphery of the outboard end of the outer member 1. The sensor unit 21 is positioned between the sealing device 7 and the raceway surface 3 in an axial direction. As shown in FIG. 2, the sensor unit 21 includes a sensor fitting member 22 formed by a ring-shaped member, and a plurality of strain sensors 23 attached to an inner peripheral surface of the sensor fitting member 22 so as to measure a strain of the sensor fitting member 22. The strain sensors 23 are arranged with uniform intervals in a circumferential direction of the sensor fitting member 22. In the embodiment shown in FIG. 3, four strain sensors are disposed with 90 degree intervals, and on upper, lower, right and left sides of the bearing, respectively.

The sensor unit 21 is press-fitted to and mounted on the inner peripheral surface of the outer member 1. The sensor fitting member 22 is formed in a shape and of material such that no plastic deformation occurs when the press-fitting force, an external force applied to the bearing or an action force between a tire of the vehicle and a road surface is applied at conceivable maximum value. The material of the sensor fitting member 22 may be metal such as a copper, a brass, an aluminum as well as a steel.

The sensor unit 21 has a set of an external force calculator 40, a road action force calculator 41, a bearing preload calculator 42 and an abnormality determiner 43 as a device for processing the output thereof. Each of the devices 40 to 43 may be provided in an electronic circuit devices (not shown) such as a circuit board attached to the outer member 1 or the like of the bearing, or may be provided in an electric control unit (ECU) on board the motor vehicle.

The seal device 8 on the inboard side includes a seal 8a made of an elastic member such as a rubber with a core metal attached to an inner peripheral surface of the outer member 1, and a slinger 8b attached to an outer peripheral surface of the inner race 10 and coming contact with the seal 8a The slinger 8b is provided with a magnetic encoder 16 for detecting a rotation, and the magnetic encorder 16 has a multipolar magnet having magnetic poles alternately in a circumferential direction. A magnetic sensor (not shown) is attached to the outer member 1 so as to confront the magnetic encoder 16.

A description will be given of an operation of the sensor-equipped bearing for the wheel mentioned above. When a load is applied to the hub axle 9, the outer member 1 is deformed by the load transmitted thereto through the rolling element 5. The deformation is transmitted to the sensor fitting member 22 attached to an inner periphery of the outer member 1 to deform the sensor fitting member 22. A strain generation in the sensor fitting member 22 is measured by the strain sensor 23.

Since the strain changes in accordance with a direction and a magnitude of the load, it is possible to calculate the external force applied to the bearing for the wheel or the action force between the tire and the road surface by predetermining a relation between the strain and the load by an experiment or a simulation. The external force calculator 40 and the road force calculator 41 respectively calculate the external force applied to the bearing for the wheel and the action force between the tire and the road surface, on the basis of the output of the strain sensor 23, in accordance with the relation between the strain and the load which is predetermined by the experiment or the simulation as mentioned above.

The abnormality determiner 43 outputs an abnormality signal in the event that it is determined that the external force applied to the bearing or the action force between the tire and the road surface, calculated as mentioned above, exceeds a predetermined tolerance value. The abnormality signal can be used for a vehicle control of the motor vehicle.

Further, by obtaining a signal indicative of the external force applied to the bearing or the action force between the tire and the road surface on a real time basis from the external force calculator 40 and the road force calculator 41, more precise vehicle control can be achieved.

Further, the bearing for the wheel is applied the preload by the inner race 10, and the preload may deform the sensor fitting member 22. Accordingly, by predetermining the relation between the strain and the preload is predetermined by the experiment or the simulation, a state of the preload on the bearing for the wheel can be ascertained. The bearing preload calculator 42 outputs a bearing preload amount on the basis of the output of the strain sensor 23 in accordance with the relation between the strain and the preload which is predetermined from the experiment or the simulation as mentioned above. Further, by using the preload amount output from the bearing preload calculator 42, the preload at a time of assembling the bearing can easily be adjusted.

The sensor fitting member 22 may not be plastically deformed nor generate a gap in a connection portion to the inner peripheral surface of the outer member 1, even in the case that the conceivable maximum load is applied to the bearing. If the plastic deformation occurs or the gap is generated, the deformation of the outer member 1 is not accurately transmitted to the sensor fitting member 22, and hence the measurement of the strain is adversely affected.

Figure 4:
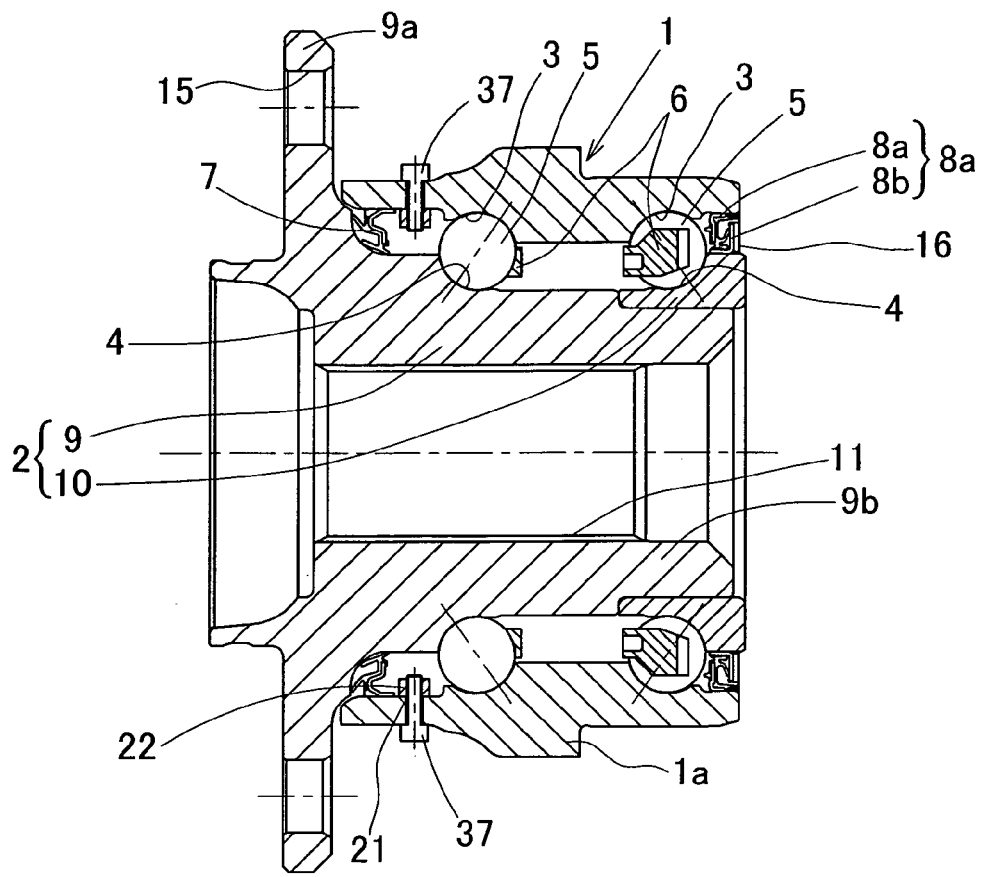
FIG. 4 is a cross sectional view of a sensor-equipped bearing for a wheel in accordance with a second embodiment of the present invention.
Figure 5:
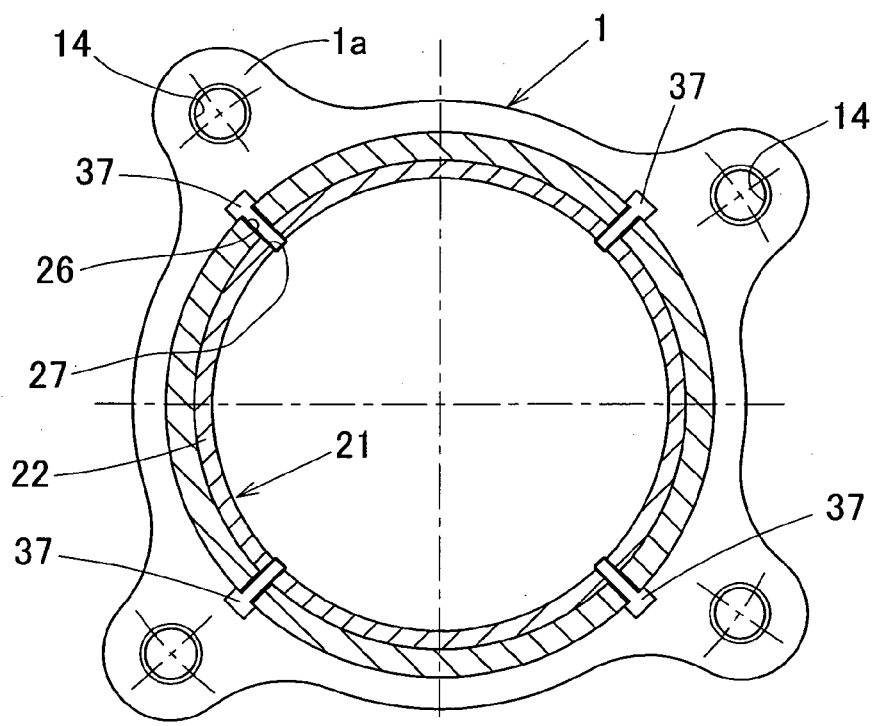
FIG. 5 is a broken front elevational view showing an outer member and a sensor unit of the sensor-equipped bearing.

For the same reason as mentioned above, in order to prevent a gap or a slip from being generated between the sensor fitting member 22 and the inner peripheral surface of the outer member 1, an adhesive agent may be used therebetween. Also, as employed in a second embodiment shown in FIGS. 4 and 5, a bolt 37 may be used for fitting the sensor fitting member 22 to the inner peripheral surface of the outer member 1. In this embodiment, the sensor fitting member 22 is fitted to the outer member 1 by inserting the bolts 37 from a plurality of bolt insertion holes 26 provided in the peripheral surface of the outer member 1, and screwing the bolts 37 into thread holes 27 provided in the sensor fitting member 22.

In the sensor-equipped bearing for the wheel, since the strain sensor 23 is attached to the sensor fitting member 22 such as the ring-shaped member attached to the inner peripheral surface of the outer member 1 serving as the stationary member, the strain sensor 23 can be installed compactly in the wheel. Since the sensor fitting member 22 is formed by a simple part attached to the outer member 1, an excellent mass production and a cost reduction can be achieved.

It is to be noted that in the first and second embodiments, the sensor fitting member 22 is fitted to the inner periphery of the outer member 1, however, may be fitted to the outer periphery of the outer member 1.

Figure 6:
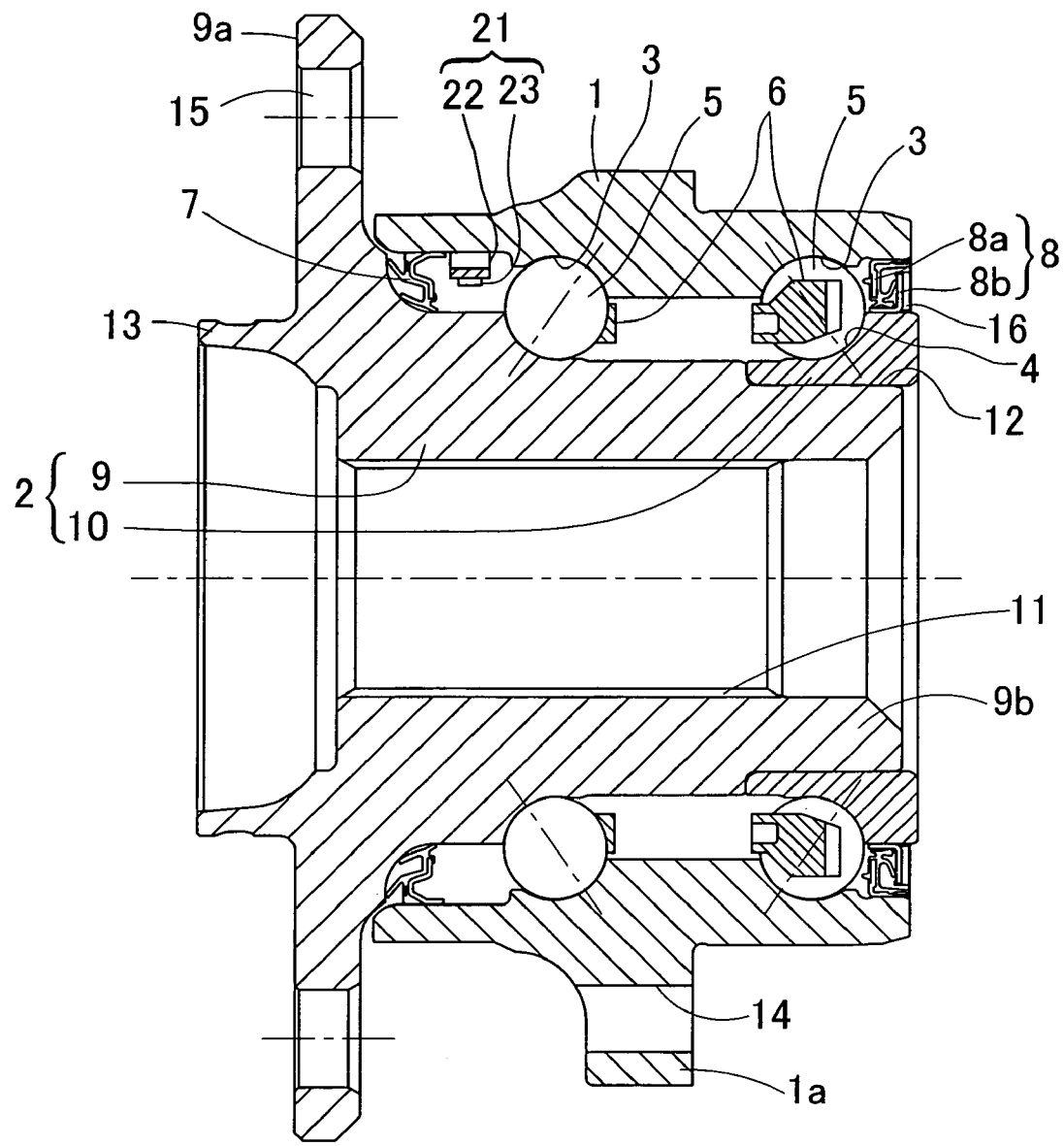
FIG. 6 is a cross sectional view of a sensor-equipped bearing for a wheel in accordance with a third embodiment of the present invention.

A description will be given of a sensor-equipped bearing for a wheel in accordance with a third embodiment of the present invention. FIG. 6 is a cross sectional view of the sensor-equipped bearing for the wheel in accordance with the third embodiment. In this third embodiment, single sensor unit 21 is attached to an inner peripheral surface of an outboard end of the outer member 1. The sensor unit 21 is positioned between the sealing device 7 and the raceway surface 3 in an axial direction in the same manner as the first embodiment mentioned above. The sensor unit 21 includes the sensor fitting member 22 fitted to the outer member 1, and the strain sensor 23 attached to the sensor fitting member 22 and measuring the strain of the sensor fitting member 22.

Figure 7:
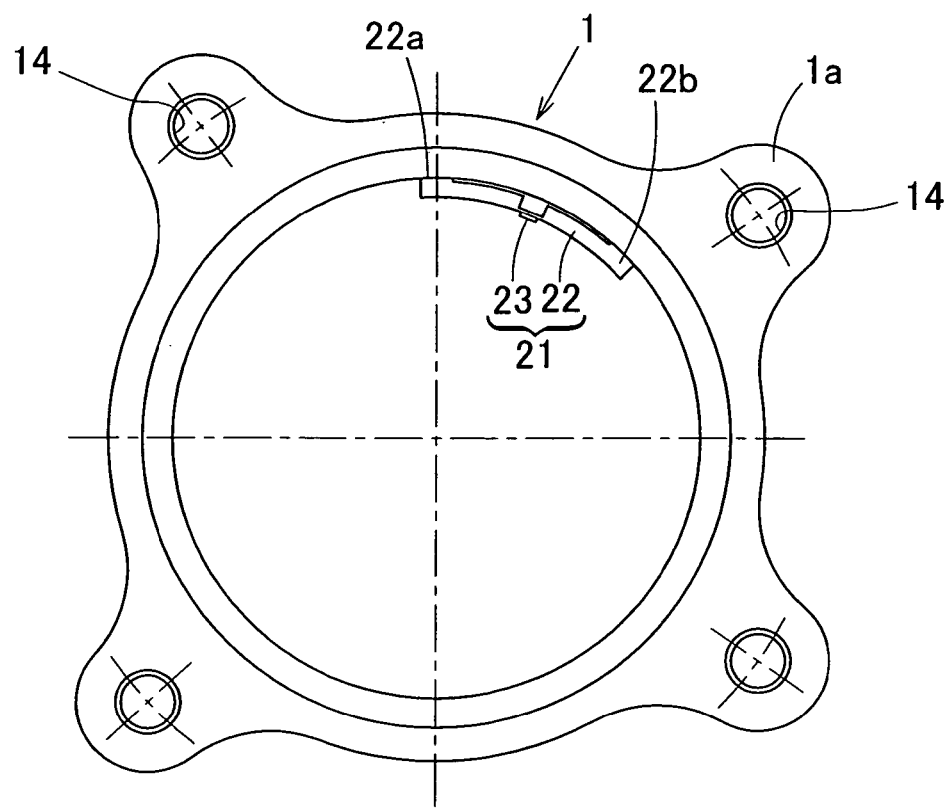
FIG. 7 is a front elevational view showing an outer member and a sensor unit of the bearing.

As shown in FIG. 7, the sensor fitting member 22 is formed as an approximately circular arc shape or arcuate shape elongated in a circumferential direction along the inner peripheral surface of the outer member 1, and has opposite ends formed with contact fixing portions 22a, 22b protruding radically outwardly of the circular arc. Further, as shown in FIG. 8, a cut-off portion, a groove or a notch 22c open radically outwardly of the circular arc is formed at a center portion in a longitudinal direction of the sensor fitting member 22, and the strain sensor 23 is attached to an inner peripheral surface of the circular arc positioned on the opposite side of the cut-off portion 22c in a radical direction of the bearing. A cross sectional shape of the sensor fitting member 22 is formed, for example, as a rectangular shape, however, may be formed as various shapes in addition thereto.

The sensor unit 21 is fixed to the inner peripheral surface of the outer member 1 through the contact fixing portions 22a, 22b of the sensor fitting member 22 so as to conform a longitudinal direction of the sensor fitting member 22 to the circumferential direction of the outer member 1. The contact fixing portions 22a, 22b are fixed to the outer member 1 by means of a bolt, an adhesive agent or the like. There exists a gap between the positions other than the contact fixing portions 22a, 22b of the sensor fitting member 22 and the inner peripheral surface of the outer member 1. The first contact fixing portion 22a, or any one of the contact fixing portions 22a and 22b, is fixed to the outer member 1 at an appropriate position in the circumferential direction at which the outer member 1 exhibits largest deformation in a radial direction by the load applied to the outer member 1. The second contact fixing portion 22b is fixed at another position at which the deformation in the radial direction is smaller than the appropriate position mentioned above.

In the case of this third embodiment, the first contact fixing portion 22a is fixed to a top position opposite to the road surface in a whole periphery of the outer member 1, and the second contact fixing portion 22b is fixed to a position which is below from the top position by several tens of degrees in the circumferential direction, for example, about 30 degrees to 45 degrees.

Various types of strain sensors 23 can be used and in this embodiment a metal foil strain gauge is employed, for example. When the metal foil strain gauge is employed, the sensor fitting member 22 is preferably structured such that a strain amount of the strain sensor 23 is equal to or less than 1500 micro strain while taking a durability of the metal foil strain gauge into consideration, when the conceivable maximum load is applied to the bearing. Further, in the case where the strain sensor 23 is constituted by a semiconductor strain gauge is employed, the sensor fitting member 22 is preferably structured such that the strain amount of the strain sensor 23 is equal to or less than 1000 micro strain while taking a durability of the semiconductor strain gauge into consideration, when the conceivable maximum load is applied to the bearing.

The basic operation of the bearing in accordance with the third embodiment is the same as the first embodiment mentioned above, and a detailed description thereof will be omitted. In this third embodiment, the sensor fitting member 22 has at least two contact fixing portions 22a, 22b fitted to the outer member 1, the stationary member, and further, has the cut-off portion 22c between the neighboring contact fixing portions 22a, 22b, and the strain sensor 23 is arranged in the cut-off portion 22c. Therefore, the rigidity of the sensor-arranged position in the sensor fitting member 22 decreases thereby generating a strain greater than that generated in the outer member 1, and as a result, the strain of the outer member 1 can sensitively be detected.

The sensor fitting member 22 is deformed in accordance with the deformation in the radial direction of the fixed position of the sensor fitting member 22 in the outer member 1. However, since the sensor fitting member 22 is of an arcuate shape and has the cut-off portion 22c in which the rigidity is lowered, the strain greater than the strain of the outer member 1 is generated in the sensor fitting member 22. Accordingly, a small strain of the outer member 1 can accurately be detected by the strain sensor 23.

The first contact fixing portion 22a of the contact fixing portions 22a, 22b of the sensor fitting member 22 is preferably attached to a position at which the deformation in the radial direction is significant in comparison with any other positions of the outer member 1, induced by the external force applied to the outer member 1 or the action force between the tire and the road surface. The deformation of the outer member 1 in the radial direction caused by the external force or the action force is varied in accordance with the position in the circumferential direction. According to a result of the finite element method (FEM) analysis, the deformation in the radial direction of the outer member 1 caused by the load in the axial direction applied to the contact point between the tire and the road surface becomes largest at nearest side and farthest side with respect to the road surface side, that is, a top position and a bottom position in the vertical direction in the outer member 1. In this embodiment, since the first contact fixing portion 22a is arranged at the top position in the vertical direction at which the largest deformation in the radial direction is generated, the strain of the outer member 1 can be detected sensitively or accurately.

In other words, where the first contact fixing portion 22a is fixed to the position at which deformation in the radial direction may be observed more largely than any other positions in the outer member 1, the second contact fixing portion 22b at which a smaller deformation is generated acts as a supporting point, and as a result, the large deformation appears at the first contact fixing portion 22a due to the deformation of the outer member 1. Accordingly, at the sensor-arranged position in the sensor fitting member 22, a still larger strain is generated, and as a result, the strain of the outer member 1 can more sensitively be detected.

In this case, the contact fixing portions 22a and 22b may be fixed to positions at which the direction of the strain in the radial direction caused by the external force applied to the outer member 1 or the action force between the tire and the road surface are inverted to each other. For example, the directions of the deformation of the outer member 1 in the radial direction caused by the load in the axial direction applied to the contact point between the tire and the road surface are inverse to each other between a position in an upper half region (a position more than 90 degree above the road surface side position) of the outer member 1, and a position in a lower half region (a position closer to the road surface side). In the case where the first contact fixing portion 22a is fixed at the top position (a position opposite to the road surface side position) of the outer member 1 and the second contact fixing portion 22b is fixed at the lower half region of the outer member 1, the directions of the deformation of the outer member 1 generated in both the contact fixing portions 22a and 22b become inversely different from each other. As mentioned above, when the first and second contact fixing portions 22a and 22b are fixed at the positions at which the directions of the strain in the radial direction of the outer member 1 are inversely different from each other, large deformation of the outer member 1 is transmitted to the sensor fitting member 22 due to the summation of the deformation of both the fixing portions 22a, 22b, thereby increasing the strain to be detected. Accordingly, the strain of the outer member 1 can be detected with a better sensitivity.

The position in the axial direction at which the sensor unit 21 is attached to the outer member 1 is set to the outboard side position than the raceway surface 3 of the outboard side of the outer member 1 as shown in the embodiment. The sensor unit 21 may be disposed at the position between the raceway surfaces 3, 3 of the double-rows, or the inboard side position than the raceway surface 3 in the inboard side. When the outboard side position than the raceway surface 3 of the outboard side is chosen, direction of the strains are varied according to the direction of the load, so that directions of the load can also be detected.

The results of the FEM analysis and the experiment reveal that only the outboard side portion of the outer member 1 among the three positions above mentioned has the positive and negative directionalities in the strain depending on the directions of the load such as the external force or the action force, in both of the strains in the radial and circumferential directions of the outer member 1. Accordingly, in order to detect the directions of the load, it is recommendable to arrange the sensor unit 21 at the position in the outboard side in the outer member 1.

The directions of the strain in the sensor unit 21 become opposite to each other at opposite sides in the circumferential direction with respect to the top position. Accordingly, even by fixing the first and second contact fixing portions 22a and 22b to the opposite sides with respect to the top position, the strain can sensitively be detected. Thus, the external force applied to the bearing for the wheel or the like can be detected on the basis of the value of the strain detected as mentioned above.

Figure 9:
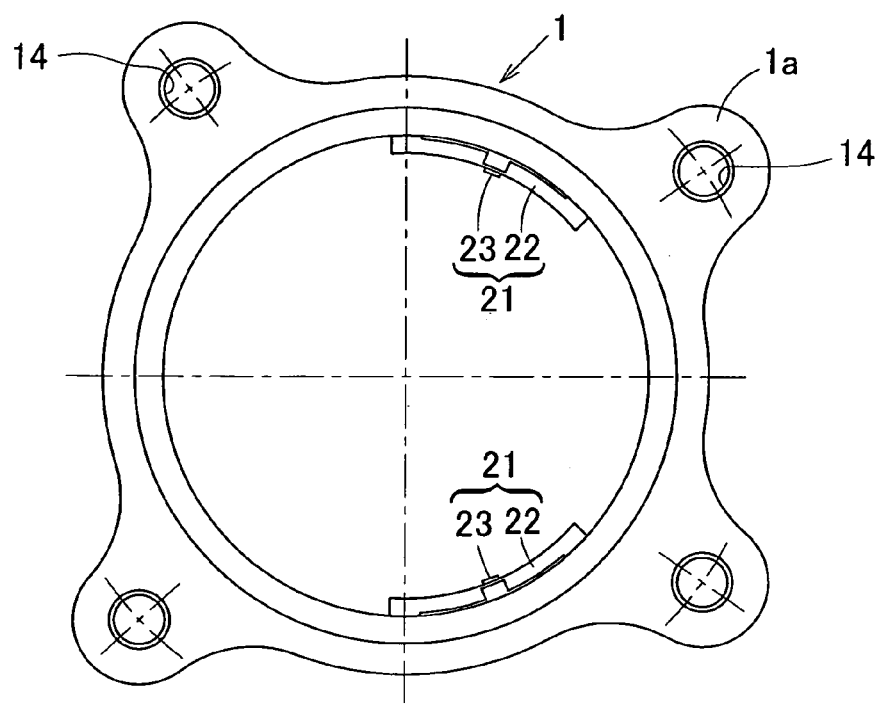
FIG. 9 is a front elevational view showing an outer member and a sensor unit of a sensor-equipped bearing for a wheel in accordance with a fourth embodiment of the present invention.
Figure 10:
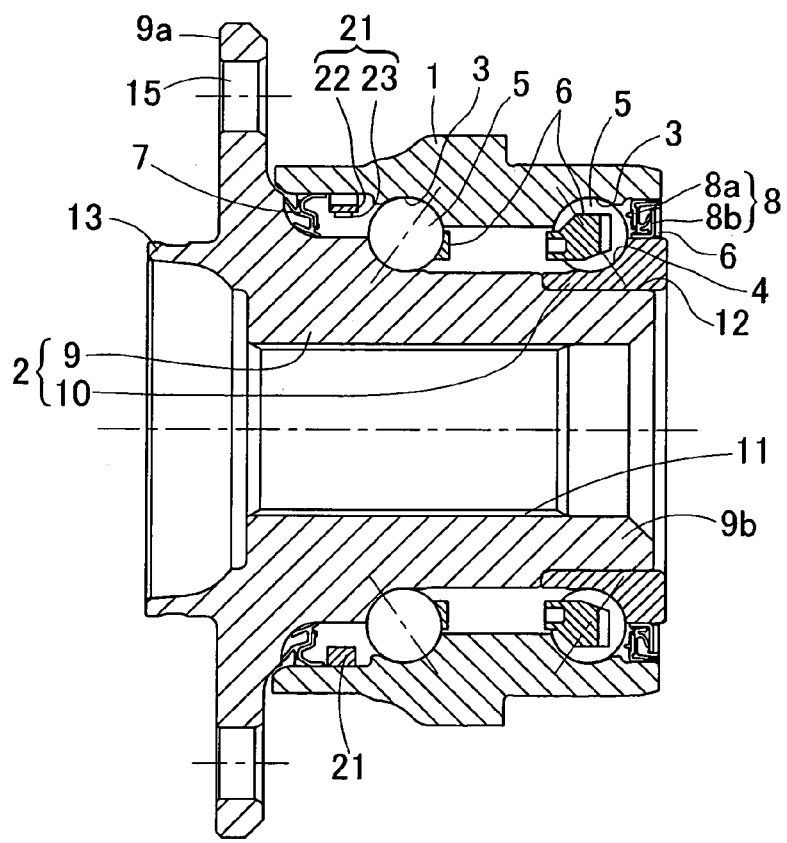
FIG. 10 is a cross sectional view of a bearing for a wheel in accordance with a fifth embodiment of the present invention.
Figure 11:
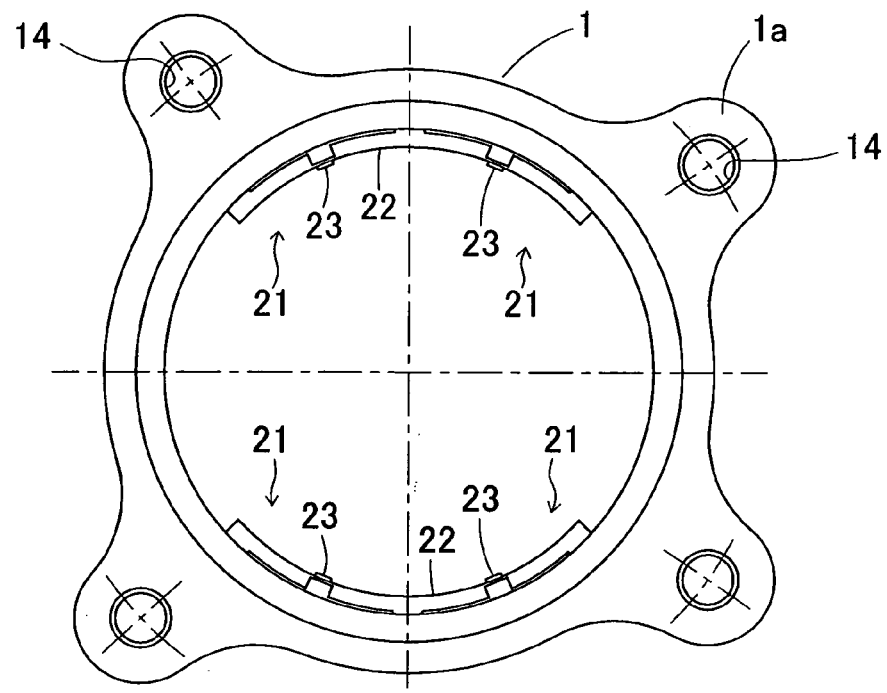
FIG. 11 is a front elevational view showing an outer member and a sensor unit of the bearing.

In this case, in the third embodiment, the sensor unit 21 is provided only at one position of the outer member 1, however, the sensor unit 21 may be provided at two positions, for example, such as in a fourth embodiment shown in FIG. 9. A cross sectional view of the bearing of the fourth embodiment appears identical with that shown in FIG. 1. The two sensor units 21 enable the load to be detected more accurately. Similarly, the sensor units 21 equal to or more than three provided at positions different to each other enable the load to be detected still further accurately. In the case that it is difficult to install a plurality of sensor units 21 due to limited space or the like, one of the contact fixing portions fixed to the inner periphery of the outer member 1 may be used in common with two sensor units 21, such as in a fifth embodiment shown in FIGS. 10 and 11.

Figure 12:
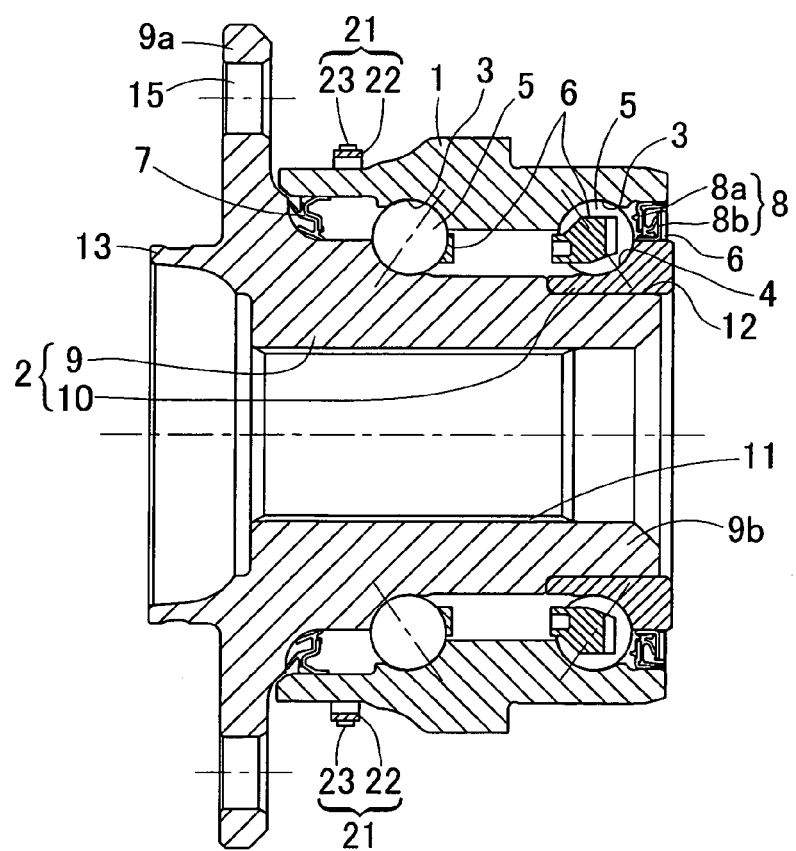
FIG. 12 is a cross sectional view of a bearing for a wheel in accordance with a sixth embodiment of the present invention.
Figure 13:
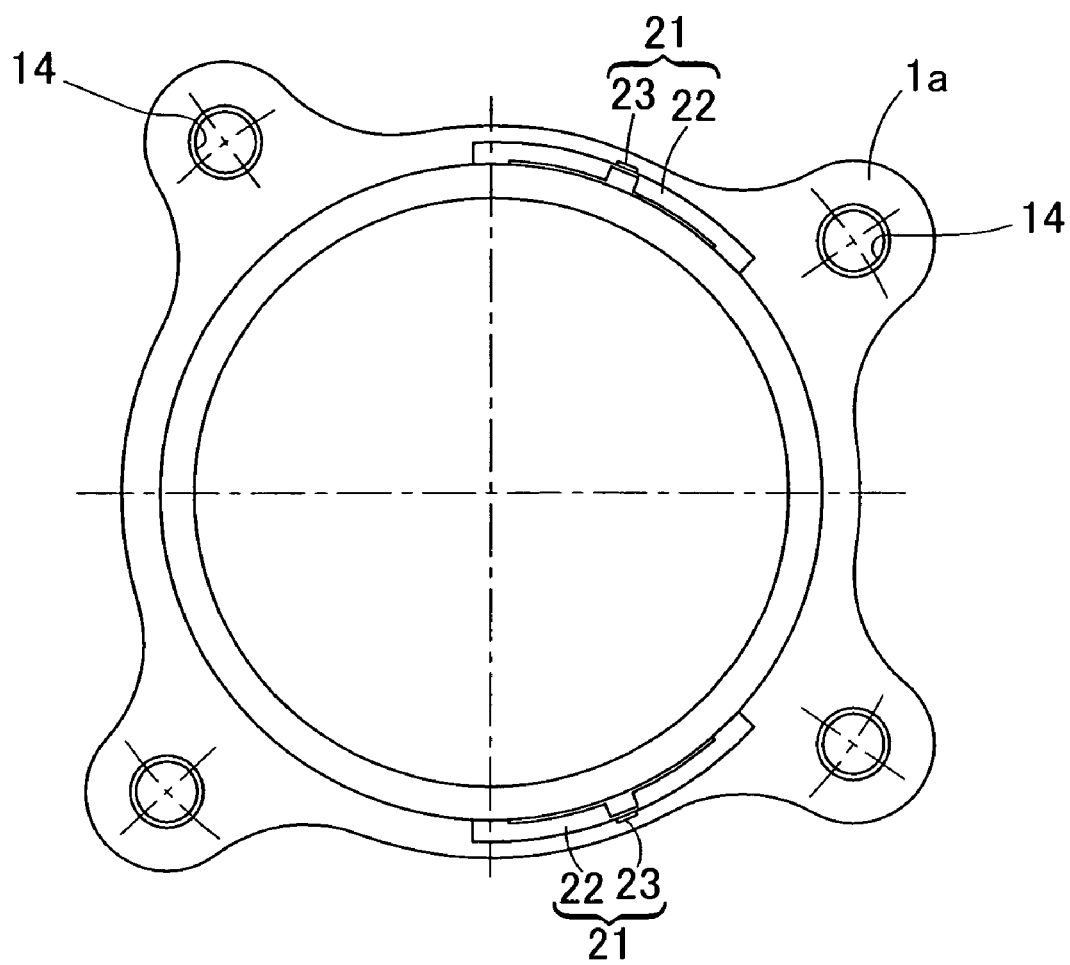
FIG. 13 is a front elevational view showing an outer member and a sensor unit of the bearing.

Further, although the sensor unit 21 has been described to be provided in the inner periphery of the outer member 1 in each of the embodiments mentioned above, the sensor unit 21 may be provided in the outer periphery of the outer member 1 such as in a sixth embodiment shown in FIGS. 12 and 13.

Figure 14:
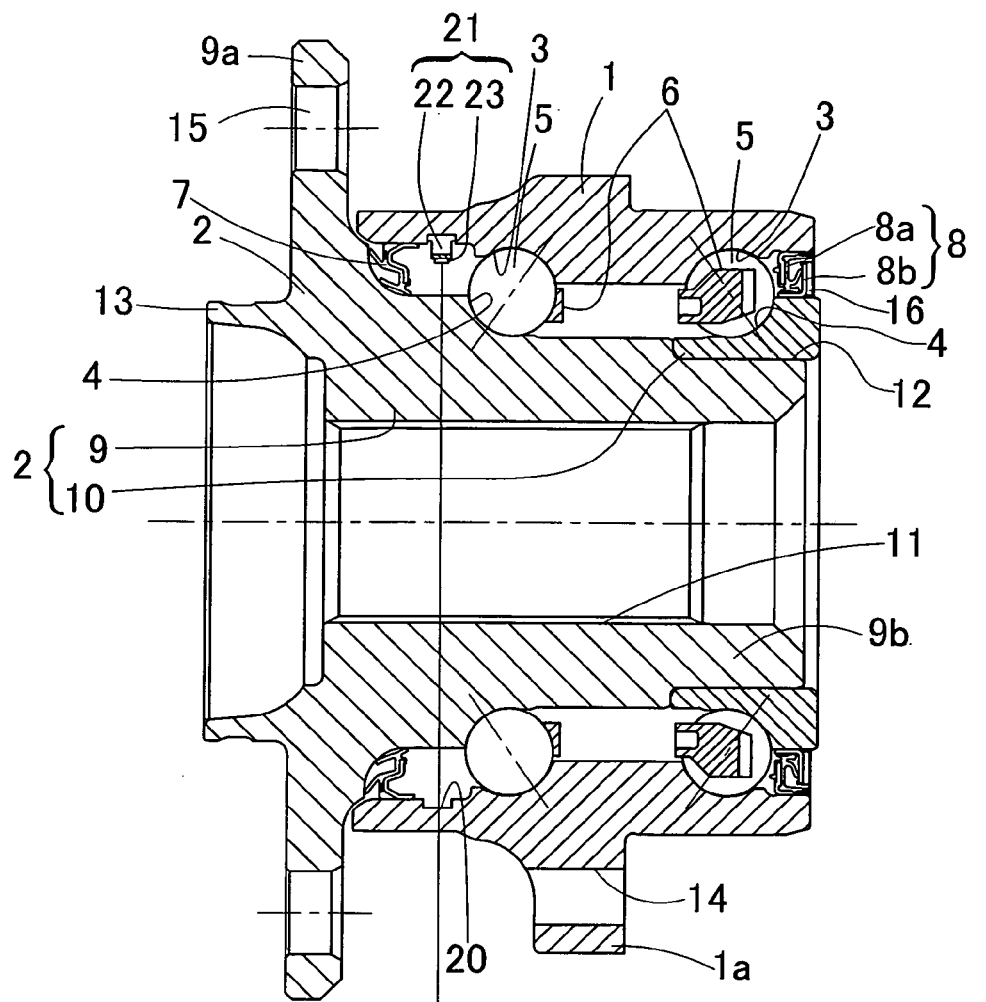
FIG. 14 is a cross sectional view of a bearing for a wheel with a block diagram detecting system in accordance with a seventh embodiment of the present invention.
Figure 14:
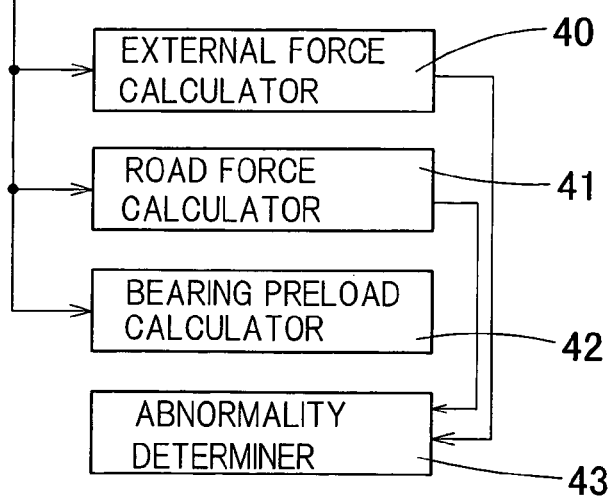
Figure 15:
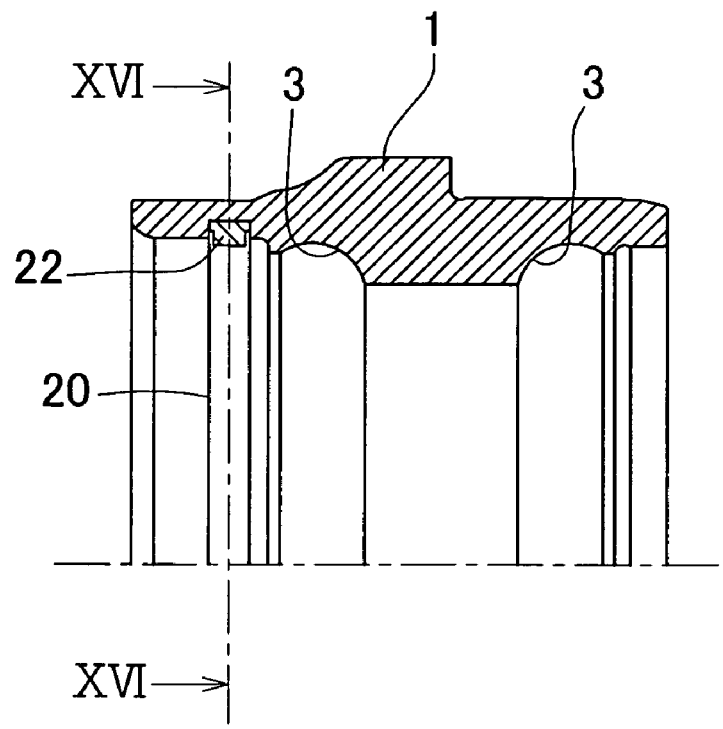
FIG. 15 is a front elevational view showing an upper half of an outer member of the bearing for the wheel.

A description will be given of a seventh embodiment in accordance with the present invention with reference to FIGS. 14 to 16. In the seventh embodiment shown in FIG. 14, a circumferential groove 20 serving as a weakened portion having a lower rigidity than the surrounding area is formed on the inner periphery of the outboard side end of the outer member 1 at a position between the sealing device 7 and the raceway surface 3 in the axial direction. The sensor unit 21 is disposed at a suitable position in the circumferential groove 20. Since the outboard side end portion of the outer member 1 has no direct effect on the tire support, there is no problem with supporting the tire even if the rigidity of this portion is lowered. The sensor unit 21 includes the sensor fitting member 22 fitted to a bottom surface of the circumferential groove 20 and the strain sensor 23 attached to the sensor fitting member 22 so as to measure the strain of the sensor fitting member 22.

Figure 16:
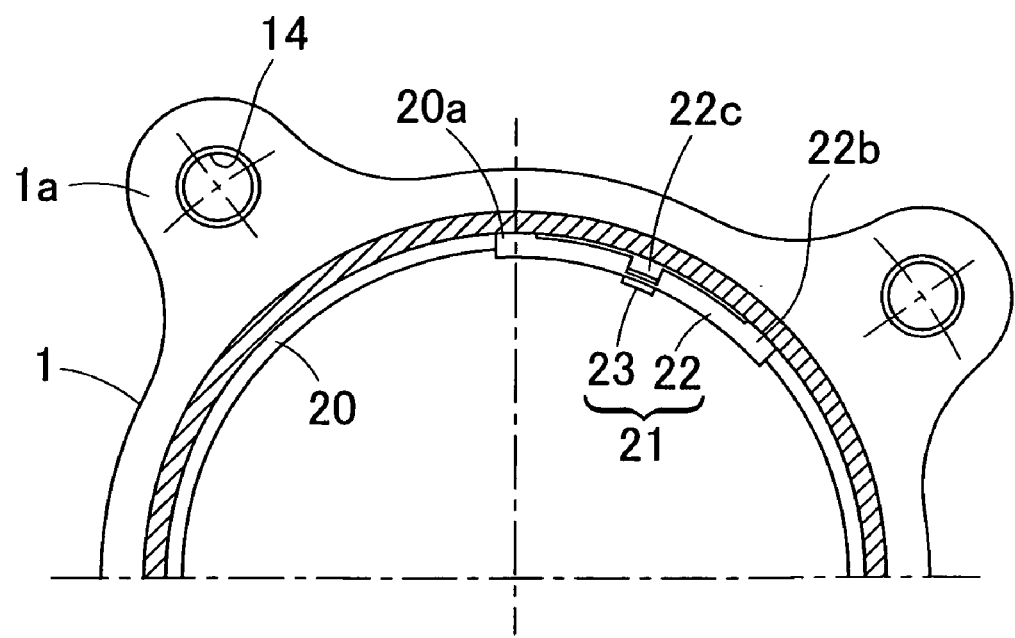
FIG. 16 is a cross sectional view along a line XVI-XVI in FIG. 15.

The sensor fitting member 22 is formed as an approximately arcuate shape elongated in a circumferential direction along the bottom surface of the circumferential groove 20, as shown in FIG. 16, and has opposite ends provided with the contact fixing portions 22a, 22b protruding radically outwardly of the arcuate and in an axial direction. Further, the cut-off portion 22c or a recessed portion open radically outwardly of the circular arc is formed at a center portion in a longitudinal direction of the sensor fitting member 22, and the strain sensor 23 is attached to an inner peripheral side of the circular arc or a surface opposite to the cut-off portion 22c. A transverse cross sectional shape of the sensor fitting member 22 is formed, for example, as a rectangular shape, however, may be formed as various shapes in addition thereto.

The sensor unit 21 is fixed to the bottom surface of the circumferential grove 20 through the contact fixing portions 22a, 22b of the sensor fitting member 22. The contact fixing portions 22a, 22b are fixed to the bottom surface of the circumferential groove 20 by means of a bolt, an adhesive agent or the like. At any other positions than the contact fixing portions 22a, 22b of the sensor fitting member 22, there exists a gap between the bottom surface or a side wall surface of the circumferential groove 20 and the sensor fitting member 22.

In the case of this seventh embodiment, the sensor unit 21 is arranged in such a manner that the one contact fixing portion 22a is fixed to the top position in a whole periphery of the outer member 1, and the other contact fixing portion 22b is fixed to a position below several tens of degrees from the top position. The portion at the top position in the whole periphery of the outer member 1 is most largely deformed in the radial direction by the load in the axial direction applied to the outer member 1, and at the portion below several tens of degrees from the top position, the deformation in the radial direction is less than that at the top position.

In the sensor-equipped bearing for the wheel, the sensor fitting member 22 is deformed in accordance with the deformation in the radial direction generated at the fixed position of the sensor fitting member 22 in the outer member 1. However, since the sensor fitting member 22 is fitted to the weakened portion in which the rigidity is lower than the surrounding area, the strain generated in the sensor fitting member 22 becomes great, and as a result, a small strain of the stationary member can be detected by the sensor unit 21. Further, since the sensor fitting member 22 is formed as the arcuate shape and has the cut-off portion 22c at which the rigidity is lowered, the strain greater than the strain in the outer member 1 is generated in the sensor fitting member 22, and as a result, a small strain of the outer member 1 can accurately be detected by the strain sensor 23.

Further, one of the contact fixing portions 22a, 22b of the sensor fitting member 22 is fixed to the top position in the whole periphery at which the outer member 1 is most largely deformed in the radial direction by the load applied to the outer member 1 and the other contact fixing portion 22b is fixed to the position below several tens of degrees from the top position at which the deformation in the radial direction is smaller than that at the top position. Therefore, the second contact fixing portion 22b at which a smaller deformation is generated acts as a supporting point, and as a result, the largest deformation appears at the first contact fixing portion 22a in accordance with the deformation of the outer member 1. Accordingly, at the sensor-arranged position in the sensor fitting member 22, a still larger strain is generated, and as a result, the strain of the outer member 1 can more sensitively be detected.

Figure 17:
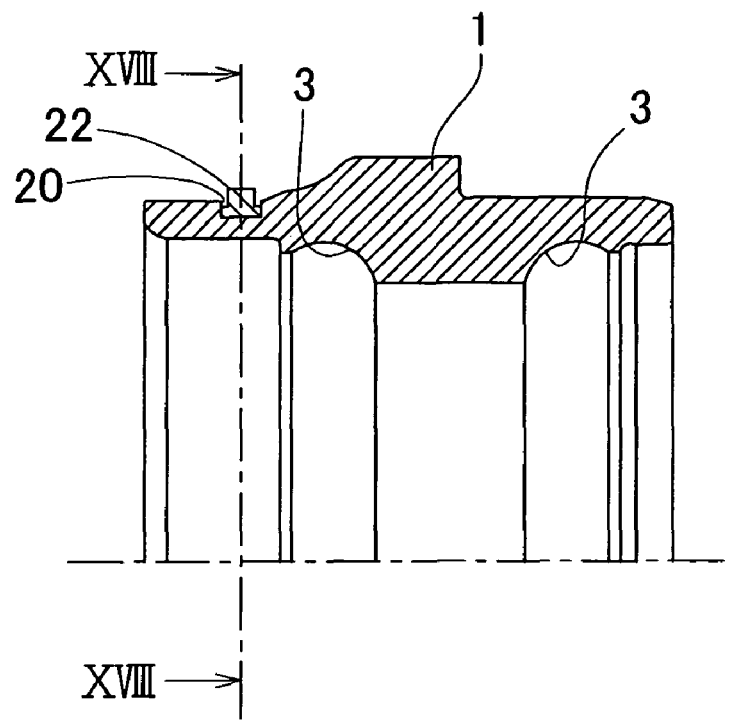
FIG. 17 is a front elevational view showing an upper half of an outer member of a sensor-equipped bearing for a wheel in accordance with an eighth embodiment of the present invention.
Figure 18:
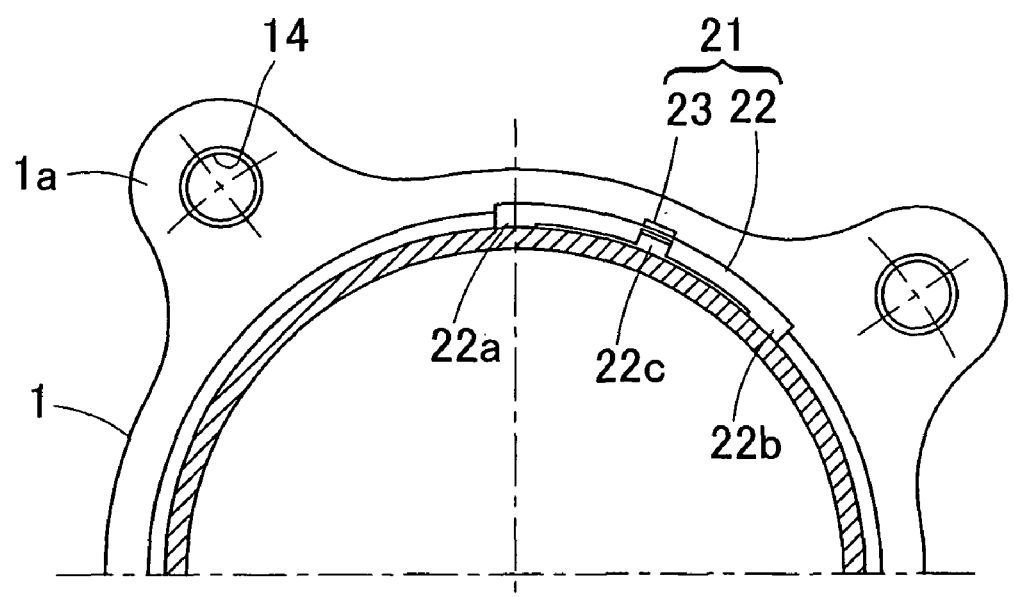
FIG. 18 is a cross sectional view along a line XVIII-XVIII in FIG. 17.

In the seventh embodiment mentioned above, the circumferential groove 20 corresponding to the weakened portion to which the sensor unit 21 is attached is formed in the inner periphery of the outer member 1. However, the circumferential groove 20 may be formed in the outer periphery of the outer member 1 and the sensor unit 21 may be arranged in the circumferential groove 20, such as in an eighth embodiment shown in FIGS. 17 and 18.

Figure 19:
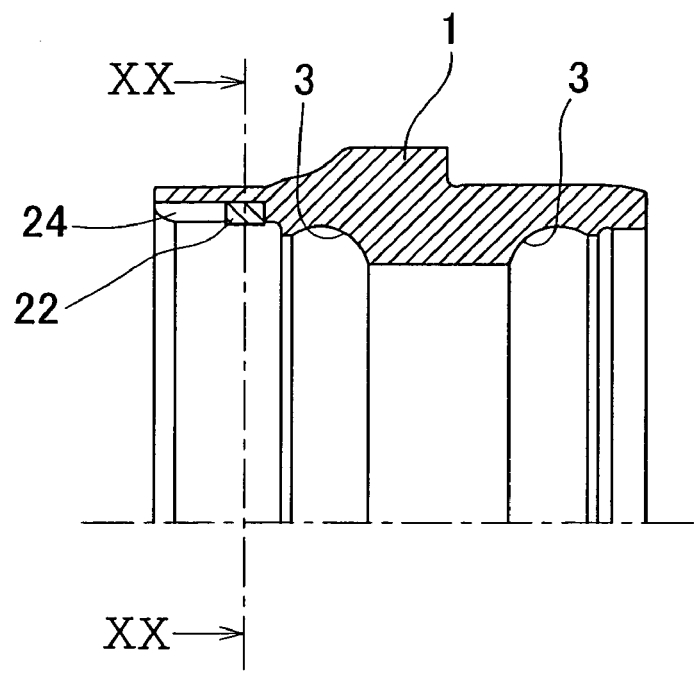
FIG. 19 is a front elevational view showing an upper half of an outer member of a sensor-equipped bearing for a wheel in accordance with a ninth embodiment of the present invention.
Figure 20:
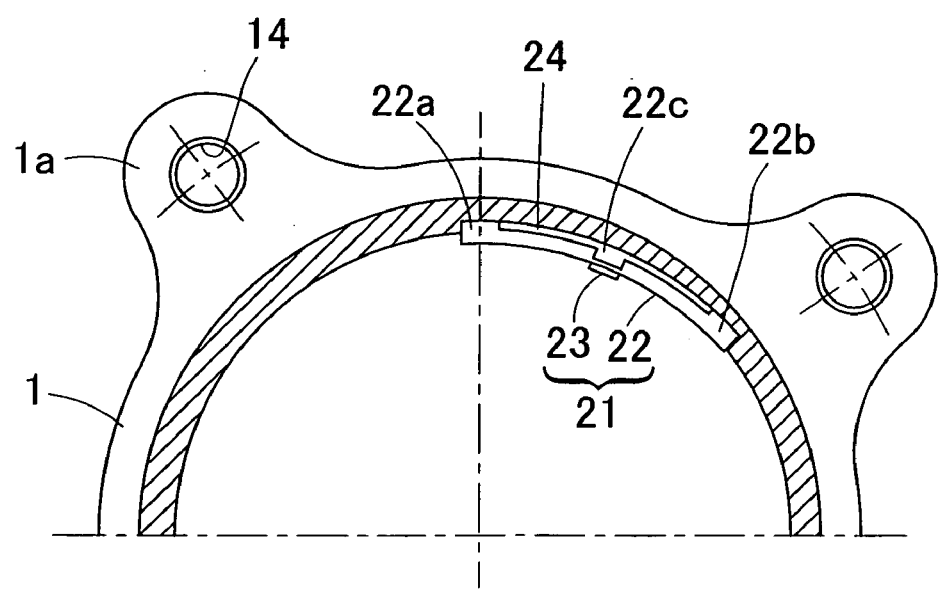
FIG. 20 is a cross sectional view along a line XX-XX in FIG. 19.
Figure 21:
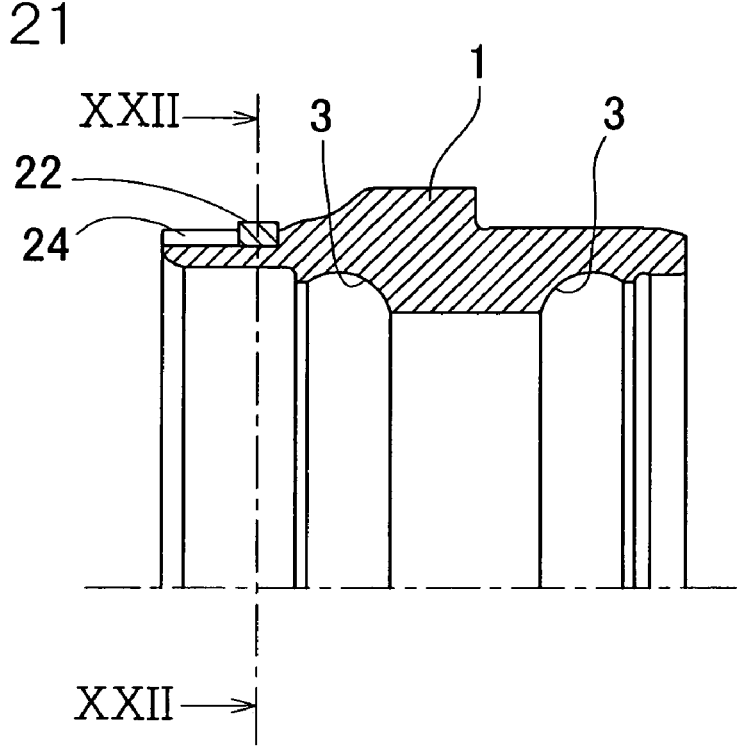
FIG. 21 is a front elevational view showing an upper half of an outer member of a sensor-equipped bearing for a wheel in accordance with a tenth embodiment of the present invention.
Figure 22:
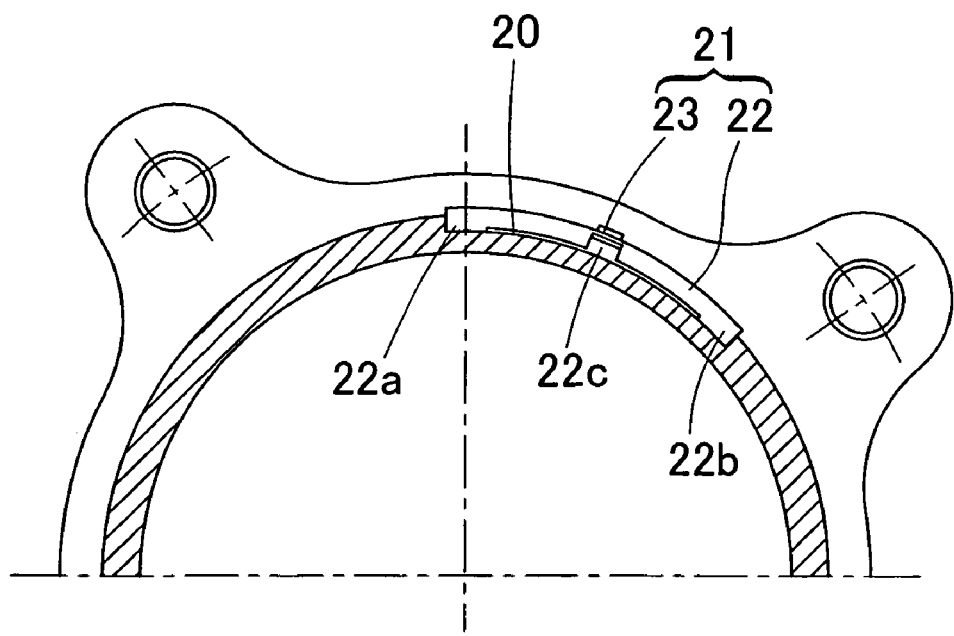
FIG. 22 is a cross sectional view along a line XXII-XXII in FIG. 21.

Further, the weakened portion to which the sensor unit 21 is attached may be formed by a groove extending in the axial direction in place of the circumferential groove. FIGS. 19 and 20 show a ninth embodiment in which a groove 24 in the axial direction to which the sensor unit 21 is attached is formed in the inner periphery of the outer member 1. FIGS. 21 and 22 show a tenth embodiment in which the groove 24 in the axial direction to which the sensor unit 21 is attached is formed in the outer periphery of the outer member 1. In the case that the groove 24 in the axial direction is formed in the inner periphery of the outer member 1 such as the ninth embodiment shown in FIGS. 19 and 20, a seal member should be mounted on the outboard side than the sensor unit 21 attached to the groove 24 in the axial direction so as to keep the bearing space sealed.

Figure 23:
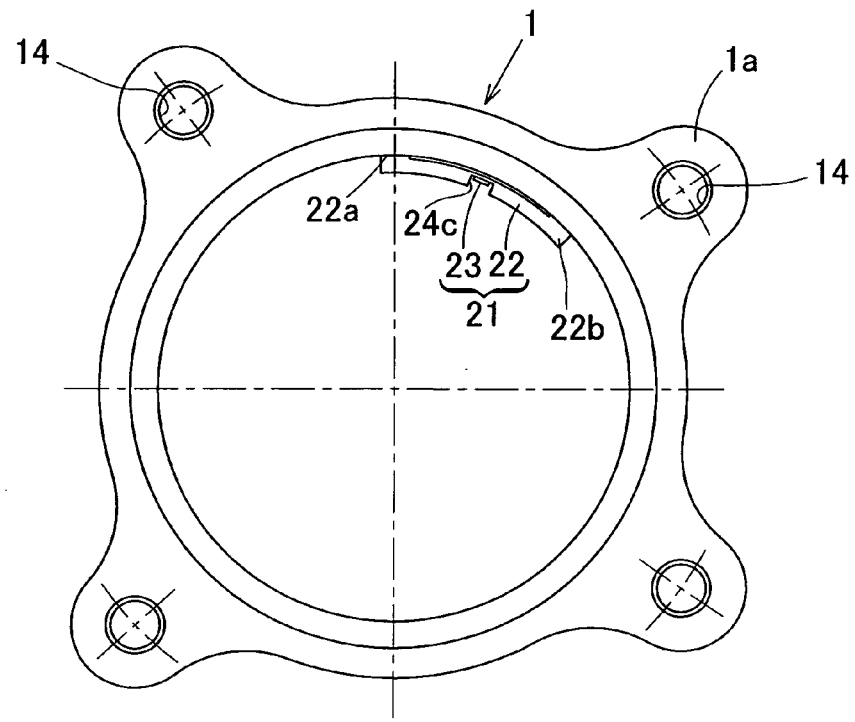
FIG. 23 is a front elevational view showing an outer member and a sensor unit of a sensor-equipped bearing in accordance with an eleventh embodiment of the present invention.
Figure 24B:
FIG. 24B is a plan view of the flat plate.
Figure 24A:
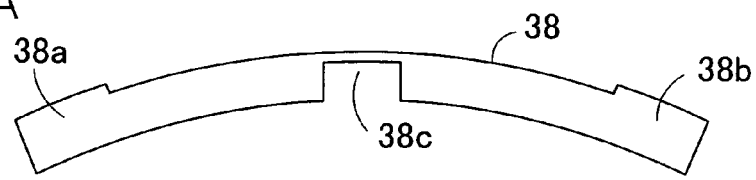
FIG. 24A is a front elevational view of a flat plate employed in the sensor unit.
Figure 25B:
FIG. 25B is a plan view of the circular arc plate employed in the sensor unit.
Figure 25A:
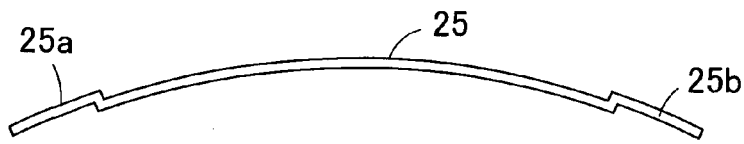
FIG. 25A is a front elevational view of a circular arc plate employed in the sensor unit.

FIG. 23 is a front elevational view showing an outer member of a sensor-equipped bearing for a wheel and a sensor unit in accordance with an eleventh embodiment of the present invention. The sensor fitting member 22 shown in FIG. 23 is formed by an arcuate shaped member having two flat plates 38 shown in FIG. 24 and an arcuate plate 25 shown in FIG. 25. The flat plate 38 is a plate member elongated in a circumferential direction in which two concentric circular arcs around an axis of rotation of the bearing are set to conform with outer and inner peripheral edges, respectively. The flat plate 38 has opposite end portions 38a, 38b thereof somewhat protruding to an outer peripheral side, and has a center portion thereof provided with a cut-off portion 38c open to an inner peripheral side. The arcuate plate 25 is formed by a plate member which is curved in an arcuate shape corresponding to the outer peripheral edge of the flat plate 38, and is provided with a step so as to form opposite end portions 25a, 25b corresponding to the opposite end portions 38a, 38b of the flat plate 38, respectively.

Figure 26A:
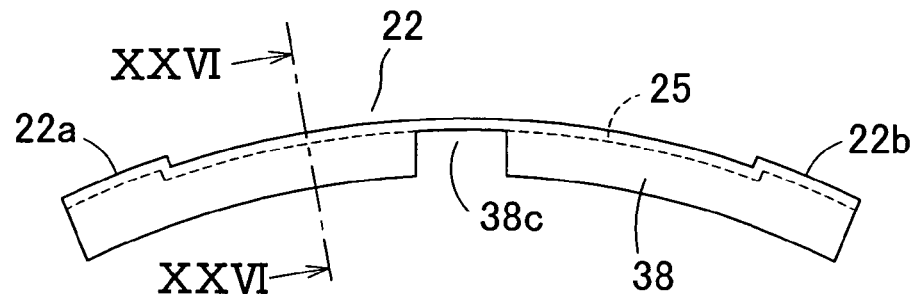
FIG. 26A is a front elevational view of the sensor unit.
Figure 26B:
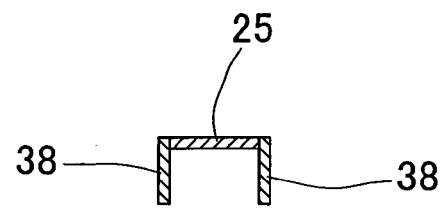
FIG. 26B is a cross sectional view along a line XXVI-XXVI in FIG. 26A.

The sensor fitting member 22 in which two flat plates 38, 38 and the arcuate plate 25 are combined as a C-shaped cross sectional shape can be obtained as shown in FIG. 26, specifically, by arranging two flat plates 38, 38 in parallel, arranging the arcuate plate 25 therebetween, and bonding the outer peripheral edge portion of the opposing surfaces of the flat plates 38, 38 to an axial end surface of the arcuate plate 25. The opposite end portions 38a, 38b of two flat plates 38 and the opposite end portions 25a, 25b of the arcuate plates 25 together form the contact fixing portions 22a, 22b of the sensor fitting member 22. The two flat plates 38, 38 and the arcuate plate 25 are obtained, for example, by means of a press working of a steel plate. The method for bonding the flat plates 38, 38 to the arcuate plate 25 is not particularly limited, and however, a welding or a brazing is suitable, for example. Further, the strain sensor 23 is attached to a center portion of the inner peripheral surface of the arcuate plate 25 in the sensor fitting member 22 formed as mentioned above, that is, at the same position in the circumferential direction as the cut-off portion 38c of the flat plate 38.

The sensor unit 21 is fixed to an inner peripheral surface of the outer member 1 at the contact fixing portions 22a, 22b of the sensor fitting member 22 by the bolt, the adhesive agent or the like. At the other positions than the contact fixing portions 22a, 22b of the sensor fitting member 22, there exists a gap between the sensor fitting member 22 and the inner peripheral surface of the outer member 1.

In the case of this eleventh embodiment, the sensor unit 21 is arranged in such a manner that the one contact fixing portion 22a is fixed to the top position in a whole periphery of the outer member 1, and the other contact fixing portion 22b is fixed to a position below several tens of degrees from the top position. The portion at the top position in the whole periphery of the outer member 1 is most largely deformed in the radial direction by the load in the axial direction applied to the outer member 1, and at the portion below several tens of degrees from the top position, the deformation in the radial direction is less than that at the top position.

In the sensor-equipped bearing mentioned above, the sensor fitting member 22 is deformed in accordance with the deformation in the radial direction generated at the fixed position of the sensor fitting member 22 in the outer member 1. Since the sensor-attached position in the sensor fitting member 22 corresponds to the position having the low rigidity in the circumferential direction corresponding to the cut-off portions 38c, 38c of the flat plates 38, 38, the strain greater than the strain of the outer member 1 is generated at the sensor-attached position, and as a result, the small strain of the outer member 1 can accurately be detected by the strain sensor 23. Further, the structure of the sensor fitting member 22, that is, the structure having at least two contact fixing portions 22a, 22b to be fixed to the outer member 1 and having at least one cut-off portion 38c between the neighboring contact fixing portions 22a, 22b can be easily obtained by connecting two parallel flat plates 38, 38 having the cut-off portion 38c formed therein and the arcuate plate 25. Since the sensor fitting member 22 mentioned above is formed as the C-shaped cross sectional shape except a portion provided with the cut-off portion 38c, there is obtained an advantage that the sensor fitting member 22 can be simply manufactured as a shape lowering the rigidity of that portion provided with the cut-off portion 38c while keeping the whole rigidity high so as to generate a great strain. In addition, since the C-shaped cross sectional shape makes the sensor fitting member 22 light in weight, a weight balance of the bearing is not adversely affected when the sensor fitting member 22 is attached to the bearing. The flat plate 38 and the arcuate plate 25 can be easily and inexpensively manufactured by means of the press work of the steel plate. Two parallel flat plates 38 and the arcuate plate 25 separately prepared may be bonded together by any method, for example, a welding or a brazing.

Further, the sensor unit 21 is arranged in such a manner that the one contact fixing portion 22a is fixed to the top position in a whole periphery of the outer member 1, and the other contact fixing portion 22b is fixed to a position below several tens of degrees from the top position. The portion at the top position in the whole periphery of the outer member 1 is most largely deformed in the radial direction by the load in the axial direction applied to the outer member 1, and at the portion below several tens of degrees from the top position, the deformation in the radial direction is less than that at the top position. Therefore, the second contact fixing portion 22b at which a smaller deformation is generated acts as a supporting point, and as a result, the largest deformation appears at the first contact fixing portion 22a in accordance with the deformation of the outer member 1. Accordingly, at the sensor-arranged position in the sensor fitting member 22, a still larger strain is generated, and as a result, the strain of the outer member 1 can more sensitively be detected.

In the embodiment mentioned above, the two flat plates 38, 38 and the arcuate plate 25 separately prepared are bonded together to define the sensor fitting member 22 of a desired shape. Alternatively, a whole of them may be integrally molded by a press work to define the unitary sensor fitting member 22. If the sensor fitting member 22 is formed as the pressed unitary product, a working step can be reduced, and as a result, the sensor fitting member 22 can inexpensively be manufactured.

Figure 27B:
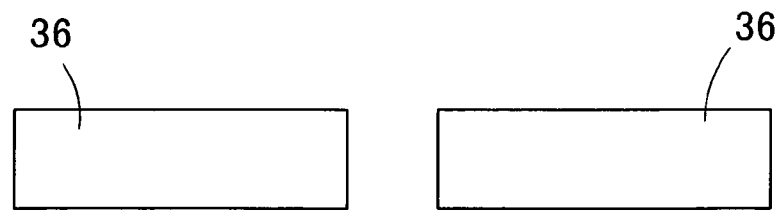
FIG. 27B is a plan view of the reinforcing member for reinforcing the sensor fitting member.
Figure 27A:
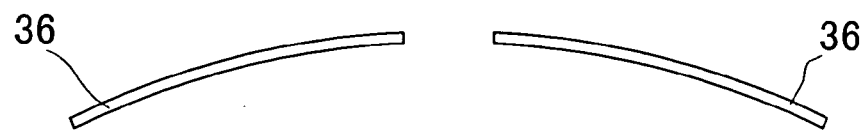
FIG. 27A is a front elevational view of a reinforcing member for reinforcing the sensor fitting member.

The sensor fitting member 22 should be formed to have a shape in which a plastic deformation does not occur, even in the case that the conceivable maximum load is applied to the bearing. The sensor fitting member 22 in accordance with the embodiment mentioned above is formed as the C-shaped cross sectional shape to have a high whole rigidity. However, in the case that the whole rigidity of the sensor fitting member 22 is insufficient, the sensor fitting member 22 may preferably be formed by adding a reinforcing member 36 shown in FIG. 27 to the sensor fitting member 22. The reinforcing member 36 is made of a plate member which is curved to have a arcuate shape corresponding to the shape of the inner peripheral edges of the flat plates 38, and a length in a circumferential direction thereof is set to a length from the inner peripheral edge end of the flat plate 38 to the cut-off portion 38c. In FIG. 27, two reinforcing members 36 are employed in line.

Figure 28A:
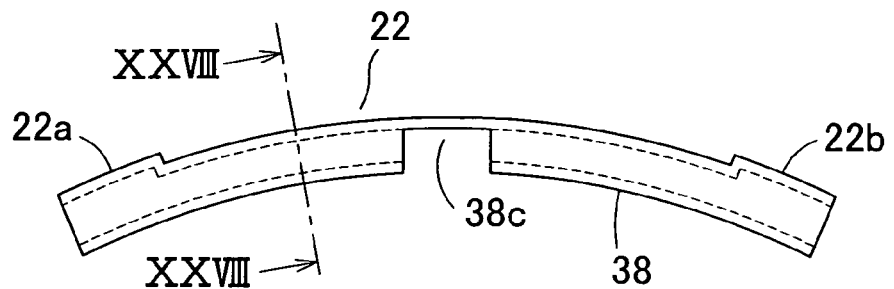
FIG. 28A is a front elevational view of a sensor unit reinforced by the reinforcing member.
Figure 28B:
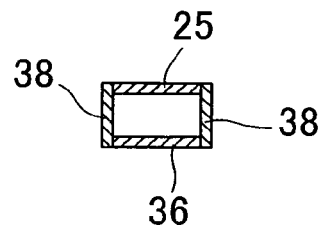
FIG. 28B is a cross sectional view along a line XXVIII-XXVIII in FIG. 28A.

As shown in FIG. 28, two flat plates 38, 38, one arcuate plate 25 and two reinforcing members 36, 36 are combined to have a rectangular cross sectional shape by bonding the outer peripheral edge portions of the opposing surfaces of two flat plates 38, 38 arranged in parallel and the axial end surface of the arcuate plate 25 together, and bonding the inner peripheral edge portions of the two flat plates 38, 38 and an end surfaces of the reinforcing members 36, 36 together. The sensor fitting member 22 mentioned above is structured such that a whole rigidity is remarkably improved.

Figure 29:
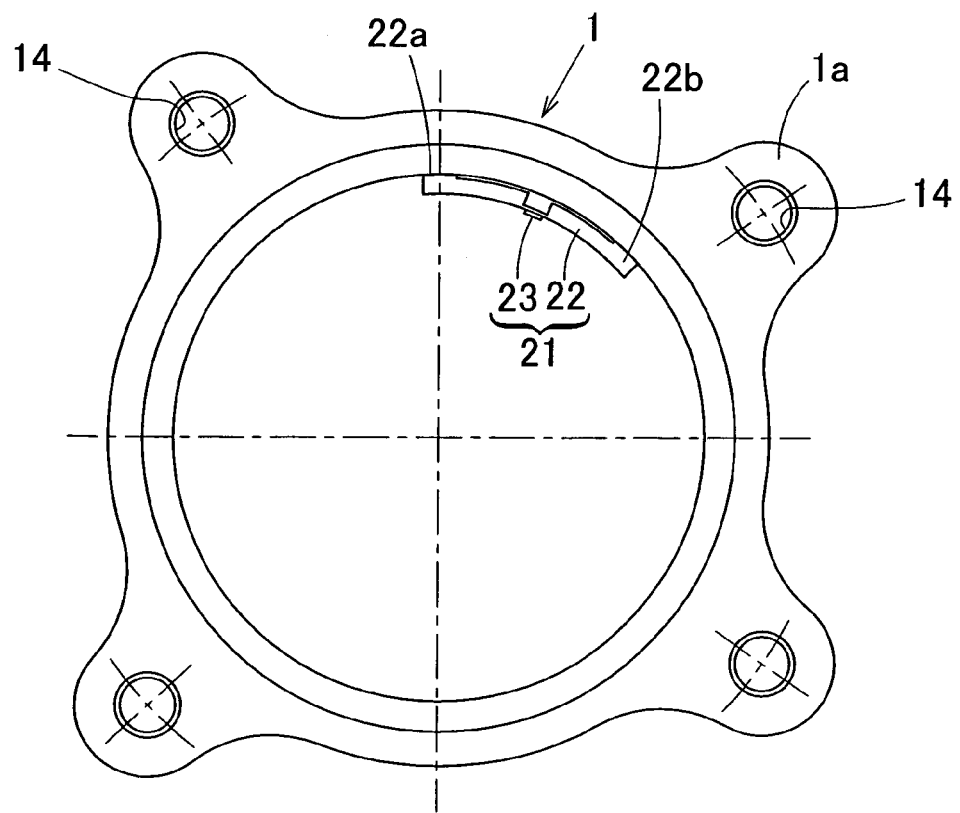
FIG. 29 is a front elevational view showing an outer member and a sensor unit of a sensor-equipped bearing for a wheel in accordance with a twelfth embodiment of the present invention.
Figure 30:
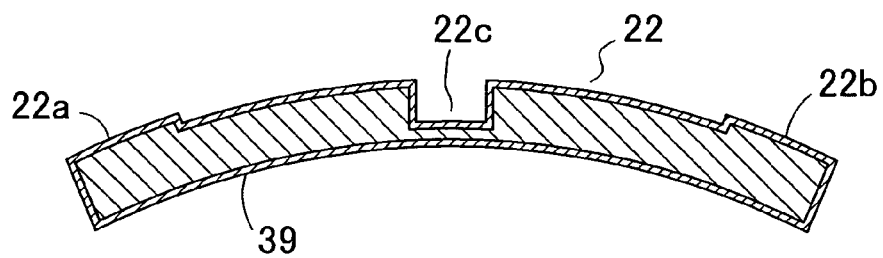
FIG. 30 is a front elevational view of the sensor unit in which a sensor fitting member is expressed by a cross section.

FIG. 29 is a front elevational view showing an outer member of a sensor-equipped bearing for a wheel and a sensor unit in accordance with a twelfth embodiment of the present invention. The sensor fitting member 22 of the sensor unit 21 used in this embodiment is structured of a arcuate shape as shown in FIG. 30 representing a cross sectional view of the sensor fitting member 22 and is coated by a film of a sacrificial anode 39. The sacrificial anode 39 should be made of a material having an electromechanically ionization tendency higher than those of the sensor fitting member 22, the strain sensor 23 and the other component member of the bearing, and preferably, for example, a zinc or a zinc alloy. In the case that the sacrificial anode 39 is made of the zinc or the zinc alloy, the film of the sacrificial anode 39 on the surface of the sensor fitting member 22 can be formed by means of plating.

An operation of the sensor-equipped bearing for the wheel mentioned above will be described. In particular, the sensor fitting member 22 is deformed in accordance with the deformation in the radial direction generated at the fixed position of the sensor fitting member 22 in the outer member 1. Since the sensor fitting member 22 is formed as the arcuate shape and is provided with the cut-off portion 22c at which the rigidity is lowered, the strain larger than the strain of the outer member 1 is generated at the sensor-attached position. Accordingly, the small strain of the outer member 1 can accurately be detected by the strain sensor 23, and as a result, the external force or the like applied to the bearing can be calculated from the value of the strain detected as mentioned above.

Since the sensor unit 21 is arranged in the annular bearing space sealed by the sealing device 7, under normal conditions the sensor unit 21 is not affected by an external environment. However, under an adverse condition a corrosive gas or a corrosive liquid may intrude into the annular bearing space from small gaps between the outer member 1 or the inner member 2 and the sealing device 7. Such adverse condition may be encountered, when, for example, the wheel travels on a road covered with salt water or on a road including the salt water inside. In this case, the salt water intrudes into the annular bearing space.

In the case that the corrosive gas or the corrosive liquid intrudes into the annular bearing space, the corrosive gas or the corrosive liquid preferentially reacts with the sacrificial anode 39 corresponding to the material having the electrochemically higher ionization tendency, thereby preventing the peripheral parts from being ionized, that is, being eluted. In other words, the strain sensor 23 and the sensor fitting member 22 can be protected from corrosion.

Figure 31:
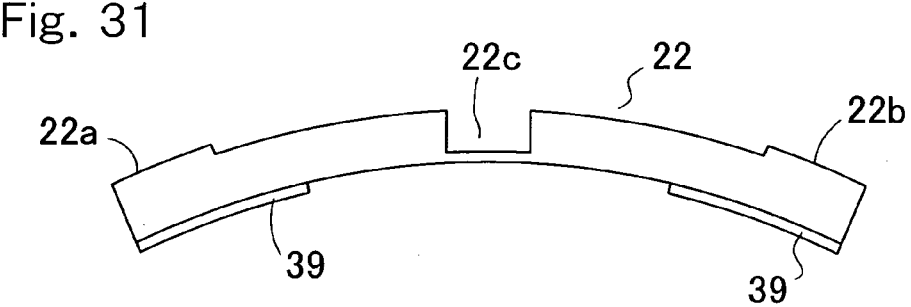
FIG. 31 is a front elevational view of another sensor unit.

In the embodiment mentioned above, the sensor fitting member 22 is completely covered with the sacrificial anode 39. Alternatively, as shown in FIG. 31, the sacrificial anode member 39 made of a bulk material, attached to an arbitrary part of the sensor fitting member 22 is effective to prevent the corrosion of the strain sensor 23 and the sensor fitting member 22. As the bulk material, for example, the zinc, the zinc alloy or the like can be employed.

Figure 32:
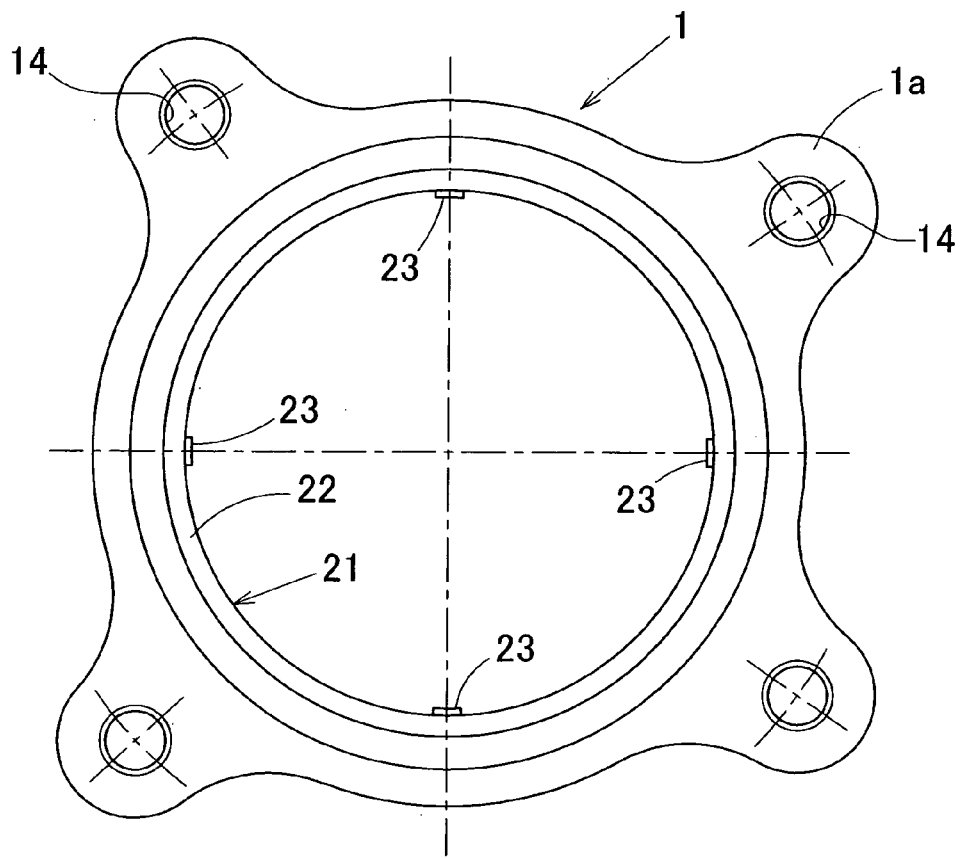
FIG. 32 is a front elevational view showing an outer member and a sensor unit of a sensor-equipped bearing for a wheel in accordance with a thirteenth embodiment of the present invention.

Further, use of the sacrificial anode 39 is not limited to the structure in which the sensor unit 21 is attached to a part in the circumferential direction of the inner periphery of the outer member 1 such as the embodiment mentioned above, but the structure may be made, as shown in FIG. 32, such that the sensor fitting member 22 formed as a ring shape and mounted on the inner periphery of the outer member 1, and a plurality of strain sensors 23 are attached to the inner peripheral surface of the ring-shaped sensor fitting member 22. In this embodiment, four strain sensors 23 are attached to upper, lower, right and left sides of the sensor fitting member 22. With a plurality of the strain sensors 23 the strains at a plurality of positions of the outer member 1 are detected by the strain sensors 23, and the load or the like applied to the wheel is detected from the output of a plurality of strain sensors 23. Accordingly, a detecting precision of the load or the like applied to the wheel is improved.

Figure 33A:
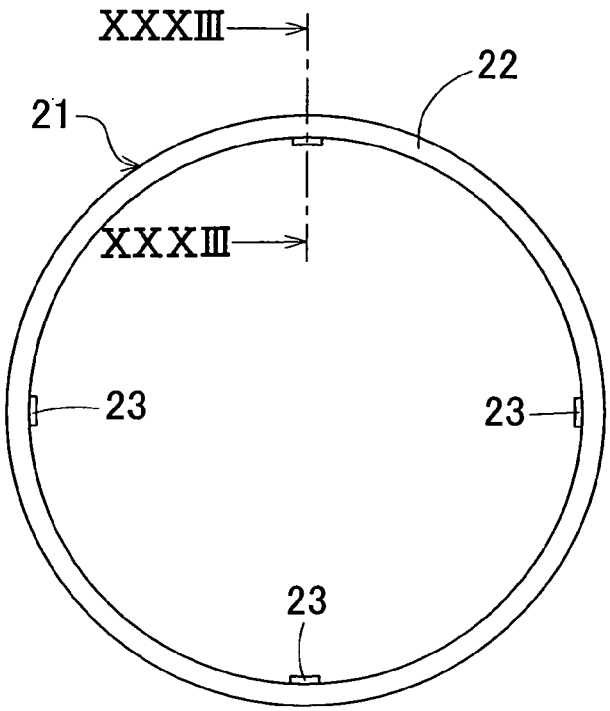
FIG. 33A is a front elevational view of the sensor unit.
Figure 33B:
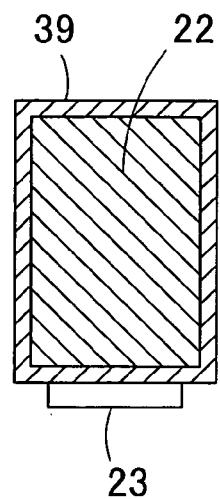
FIG. 33B is a cross sectional view along a line XXXIII-XXXIII in FIG. 33A.
Figure 34:
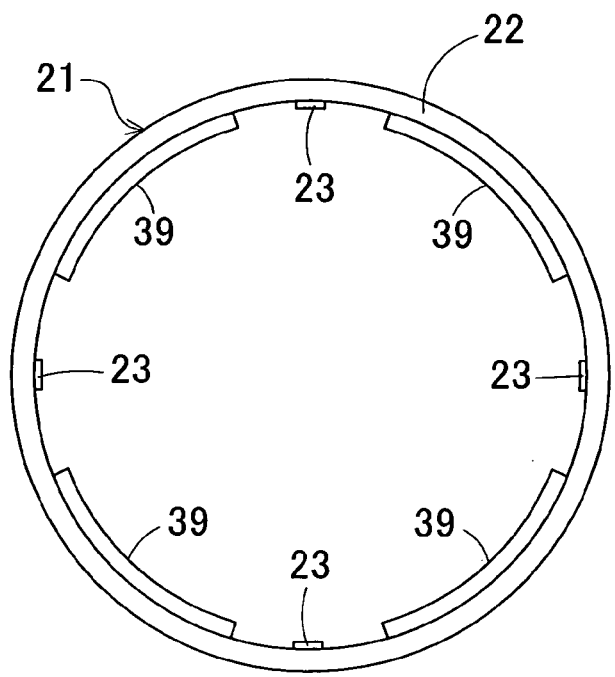
FIG. 34 is a front elevational view of another sensor unit.

In the case that the sensor fitting member 22 of the sensor unit 21 is formed as the ring shape, the sensor fitting member 22 may be completely covered with the sacrificial anode 39 as shown in FIG. 33, or the sacrificial anode member 39 may be attached to an arbitrary part of the sensor fitting member 22 as shown in FIG. 34.

Figure 35:
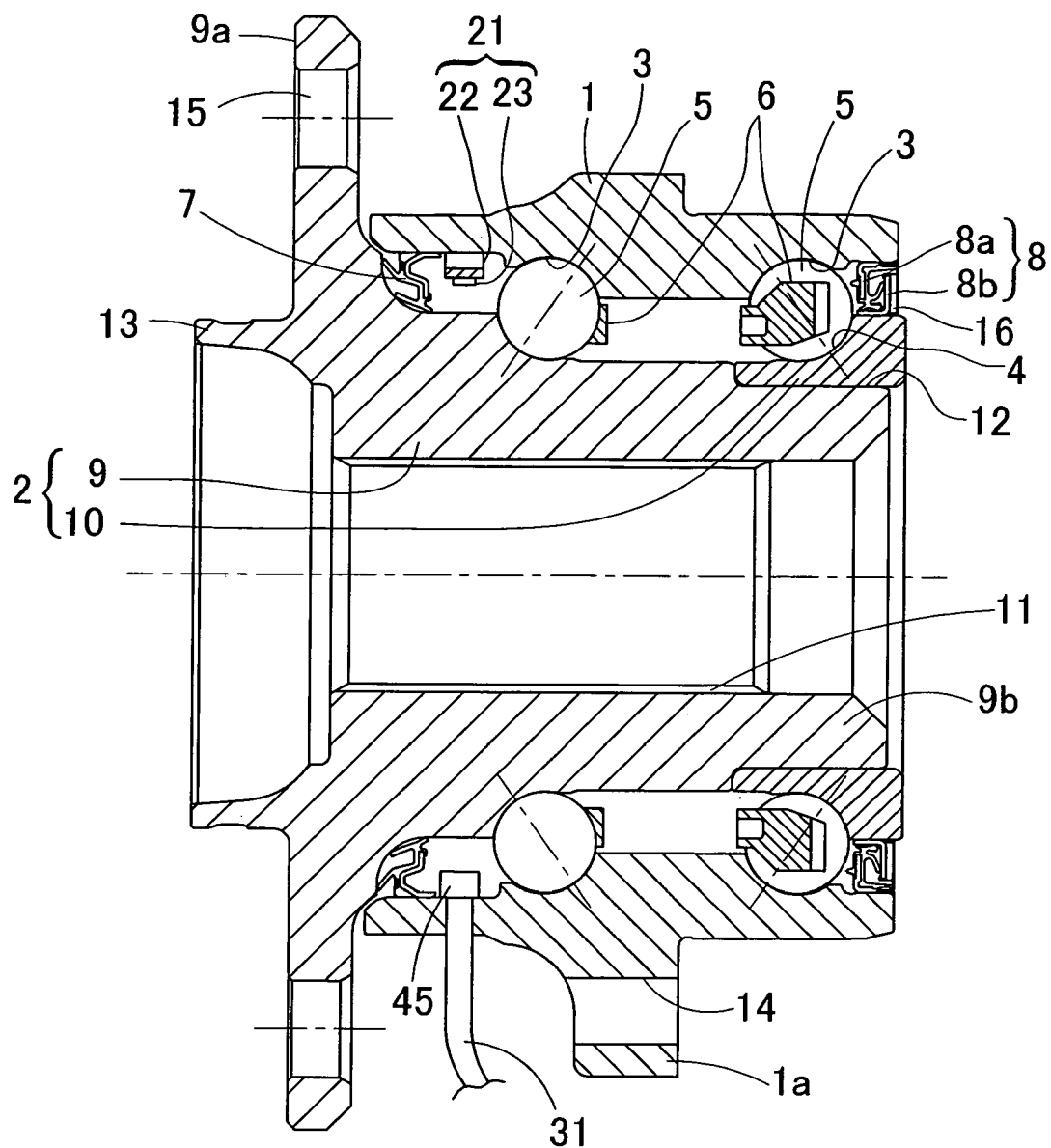
FIG. 35 is a cross sectional view of a sensor-equipped bearing for a wheel in accordance with a fourteenth embodiment of the present invention.

Next, a description will be given of a sensor-equipped bearing for a wheel in accordance with a fourteenth embodiment of the present invention with reference to FIG. 35. FIG. 35 is a cross sectional view of the sensor-equipped bearing for the wheel in accordance with the fourteenth embodiment of the present invention. In the sensor-equipped bearing shown in FIG. 35, the inner peripheral surface of the outboard side end of the outer member 1 is provided with two sensor units 21 and a sensor signal processing circuit unit 45 electrically connected to the sensor units 21. The units 21, 21 and 45 are disposed at positions occupying a single position in an axial direction and attached to a portion positioned on the outboard side of the outboard side raceway surface 3, more specifically, between the outboard side raceway surface 3 and the sealing device 7.

Figure 36:
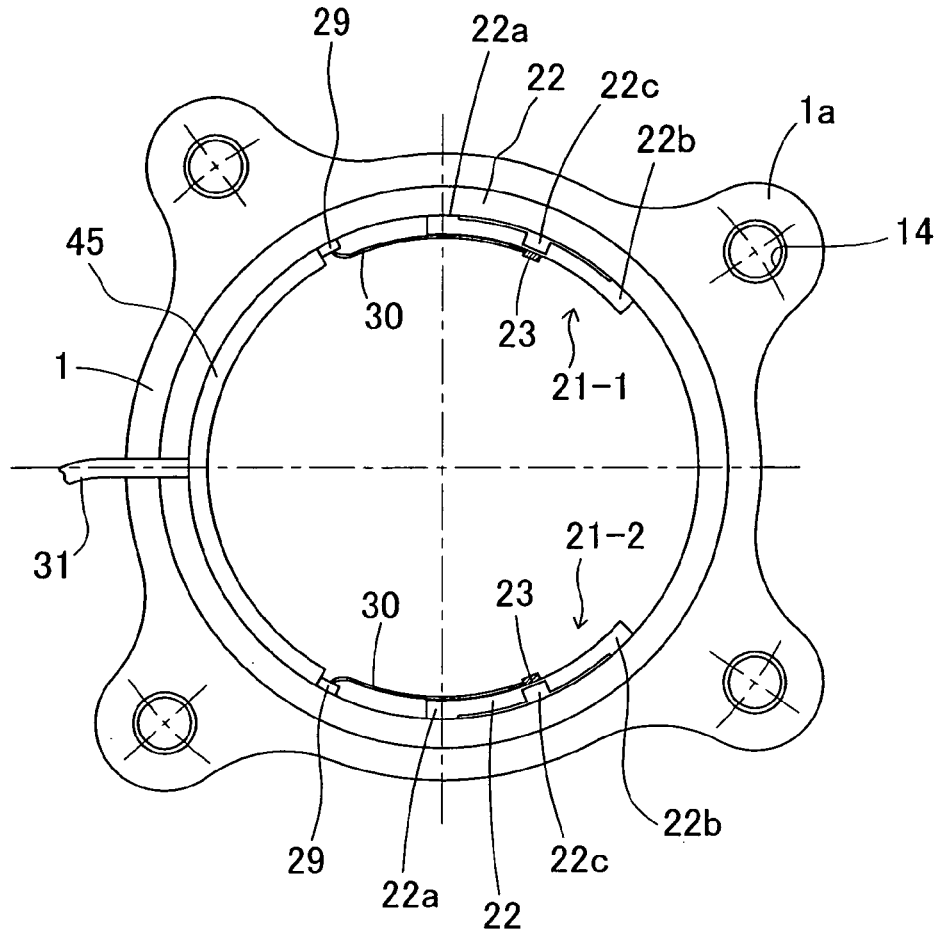
FIG. 36 is a front elevational view showing an outer member, a sensor unit and a sensor signal processing circuit unit of the bearing for the wheel.
Figure 37A:
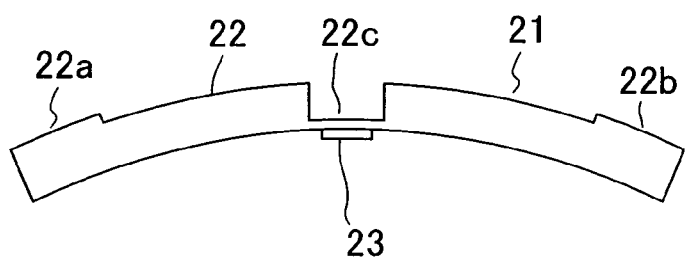
FIG. 37A is a front elevational view of the sensor unit.
Figure 37B:
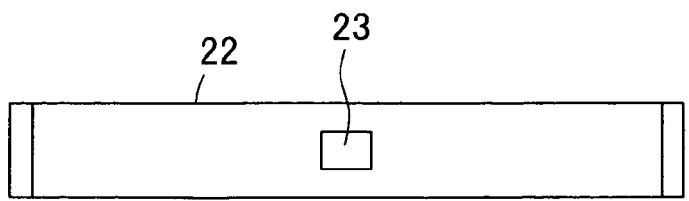
FIG. 37B is a plan view of the sensor unit.

As shown in FIGS. 36 and 37, the sensor fitting member 22 is formed as an approximately arcuate shape elongated in a circumferential direction along the inner peripheral surface of the outer member 1, and has opposite ends provided with the contact fixing portions 22a, 22b protruding radically outwardly of the circular arc. Further, the cut-off portion 22c open radically outwardly of the circular arc is provided at a center portion of the sensor fitting member 22, and the strain sensor 23 is attached to a surface in the inner peripheral side of the circular arc positioned on surface opposite to the cut-off portion 22c. A horizontal cross sectional shape of the sensor fitting member 22 is formed, for example, as a rectangular shape, however, can be formed as various shapes.

In the case of this fourteenth embodiment, the two sensor units 21 are provided at two positions in the circumferential direction on the inner peripheral surface of the outer member 1. The first sensor unit 21-1 is attached in such a manner that one contact fixing portion 22a is fixed to the top position in the whole periphery of the outer member 1 and the other contact fixing portion 22b is fixed below several tens of degrees from the top position. Further, the second sensor unit 21-2 is attached in such a manner that one contact fixing portion 22a is fixed to the bottom position in the whole periphery of the outer member 1, and the other contact fixing portion 22b is fixed above several tens of degree from the bottom portion. The positions at the top position and the bottom position in the whole periphery of the outer member 1 are most largely deformed in the radial direction by the load applied to the outer member 1. The portions at the position which is below several tens of degrees from the top position and at the position which is above several tens of degrees form the bottom position are deformed in the radial direction less than that at the top position and the bottom position.

Figure 38:
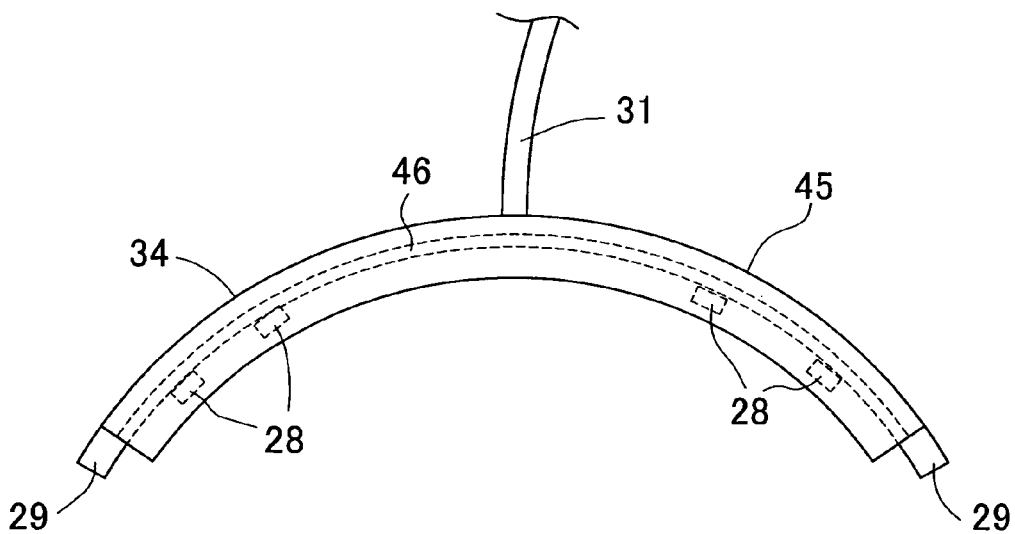
FIG. 38 is a front elevational view of the sensor signal processing circuit unit.

As shown in FIGS. 36 and 38, the sensor signal processing circuit unit 45 has a circular arc shaped housing 34, molded by a resin or the like and extending along the inner peripheral surface of the outer member 1. A circuit board 46, made of a glass epoxy or the like, on which a plurality of electric and electronic parts 28 are arranged is accommodated in the housing 34. A plurality of electric and electronic parts 28 includes an operational amplifier processing the output signal of the strain sensor 23, a resistance, a microcomputer or the like and a power supply part for driving the strain sensor 23. A sensor signal processing circuit for processing the output signal of the strain 23 is formed by the circuit board 46 and the electric and electronic parts 28. An end portion of the housing 34 has opposite ends provided with connection portions 29 to each other of which an end portion of a wiring 30 connected to the strain sensor 23 is bonded. Further, the housing 34 has a center portion to which a cable 31 for supplying an electric power to the sensor signal processing circuit and outputting the signal processed by the sensor signal processing circuit is connected.

Figure 39:
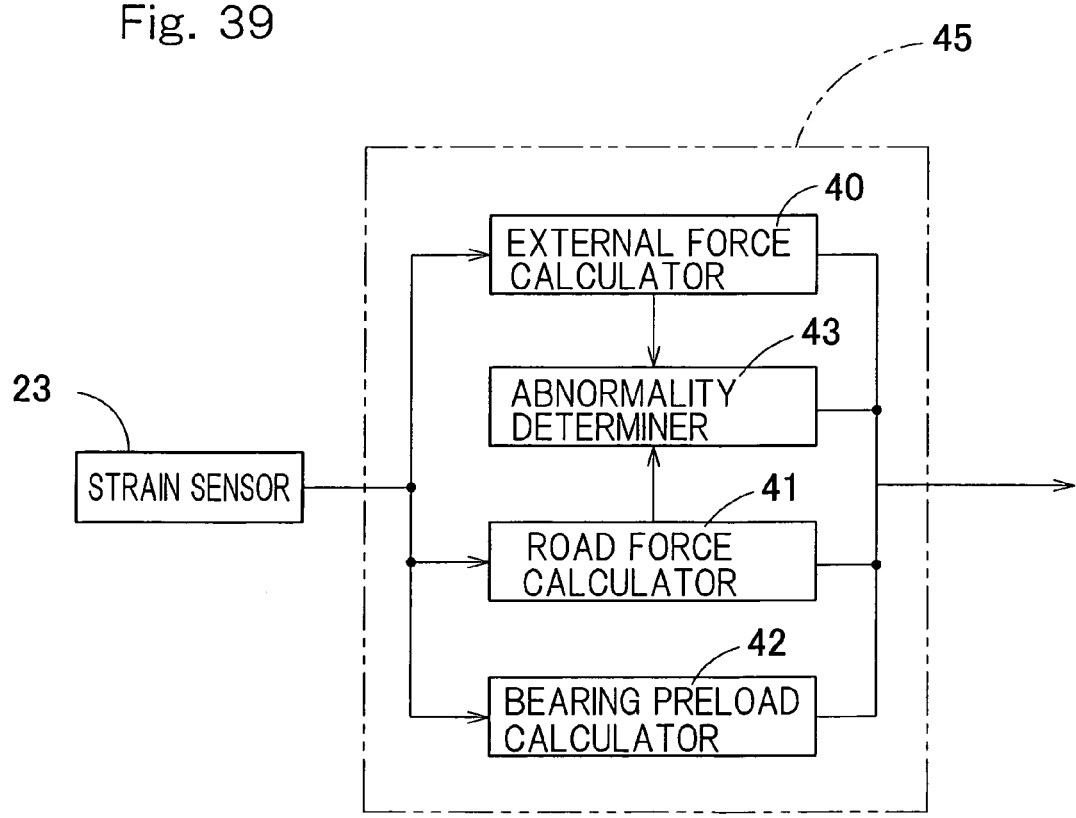
FIG. 39 is a block diagram of the sensor signal processing circuit unit.

As shown in FIG. 39 representing a block diagram, the sensor signal processing circuit unit 45 includes an external force calculator 40, a road force calculator 41, a bearing preload calculator 42 and an abnormality determiner 43.

In the sensor-equipped bearing for the wheel mentioned above, Since the sensor fitting member 22 has the cut-off portion 22c between the neighboring contact fixing portions 22a, 22b and the strain sensor 23 is attached to the cut-off portion 22c, the one portion in the sensor fitting member 22 generates a strain greater than that generated in the stationary member due to a reduction of its rigidity, and as a result, the strain of the stationary member can be sensitively detected. Also, since the sensor signal processing circuit unit 45 is provided near the sensor unit 21, a wiring connecting the strain sensor 23 and the sensor signal processing circuit 45 is simplified, thereby facilitating wiring work, and further, a whole detecting system can be downsized in comparison with the case that the sensor signal processing circuit is provided in a position other than the bearing.

Further, since the sensor unit 21 is attached to the outboard side than the outboard side raceway surface 3, the strain larger than that of the outer member 1 is generated at the sensor fitting member 22. The strain of the sensor fitting member 22 is measured by the strain sensor 23. The sensor fitting member 22 is deformed in accordance with the deformation in the radial direction of the fixed position of the sensor fitting member 22 in the outer member 1. However, since the sensor fitting member 22 is of an arcuate shape and has the cut-off portion 22c in which the rigidity is lowered, the strain greater than the strain of the outer member 1 is generated in the sensor fitting member 22. Accordingly, a small strain of the outer member 1 can accurately be detected by the strain sensor 23.

The external force applied to the bearing or the like is detected by processing the output signal of the strain sensor 23 by the sensor signal processing circuit of the sensor signal processing circuit unit 45. Since the change of the strain is varied in accordance with the direction and the magnitude of the load, it is possible to calculate the external force applied to the bearing or the action force between the tire and the road surface by predetermining the relation between the stain and the load from the experiment or the simulation. The external force calculator 40 and the road surface action force calculator 41 respectively calculate the external force applied to the bearing and the action force between the tire and the road surface, on the basis of the output of the strain sensor 23, from the relation between the strain and the load which relation is predetermined from the experiment or the simulation as mentioned above.

Figure 40:
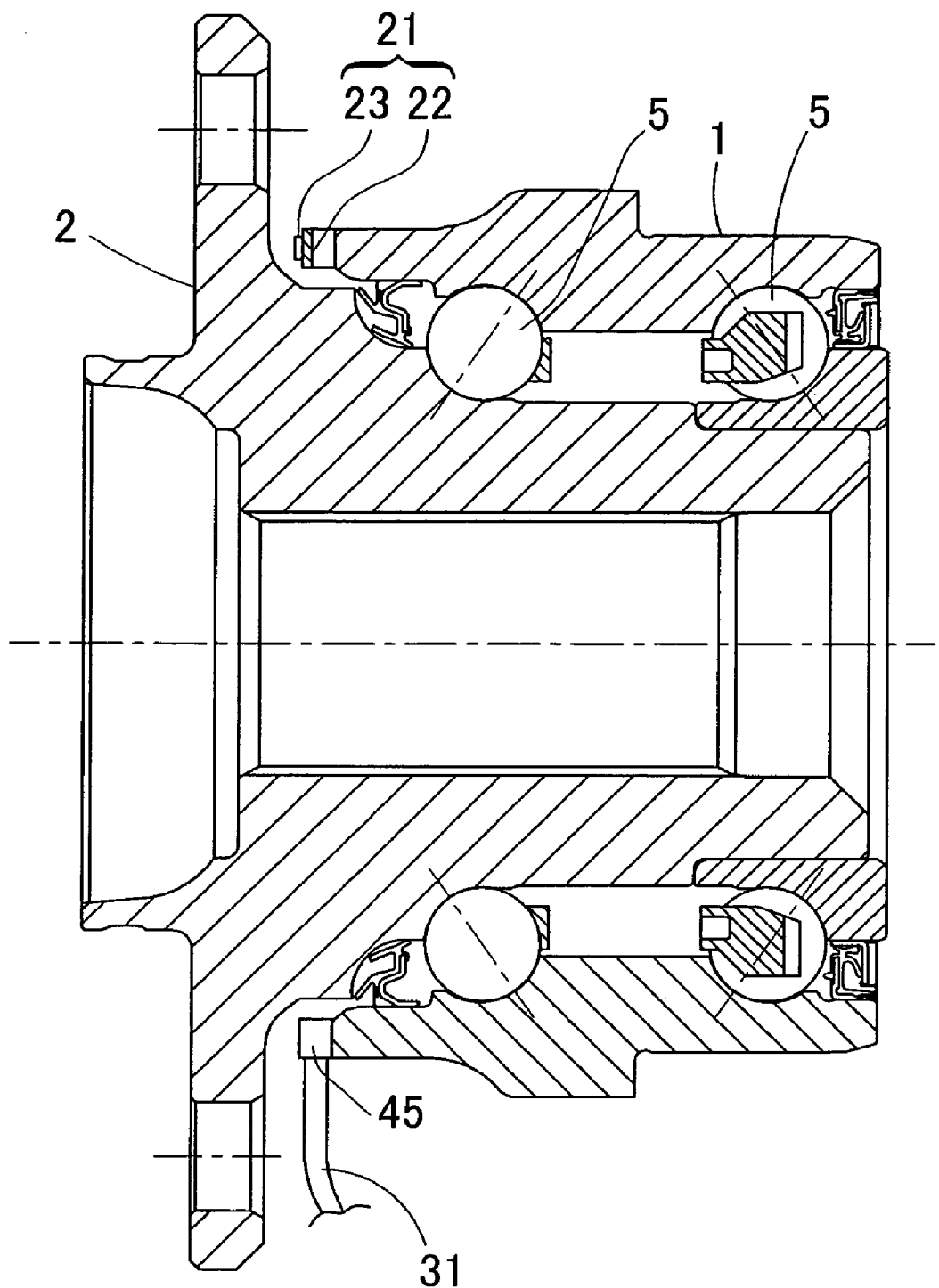
FIG. 40 is a cross sectional view of a sensor-equipped bearing for a wheel in accordance with a fifteenth embodiment of the present invention.
Figure 41:
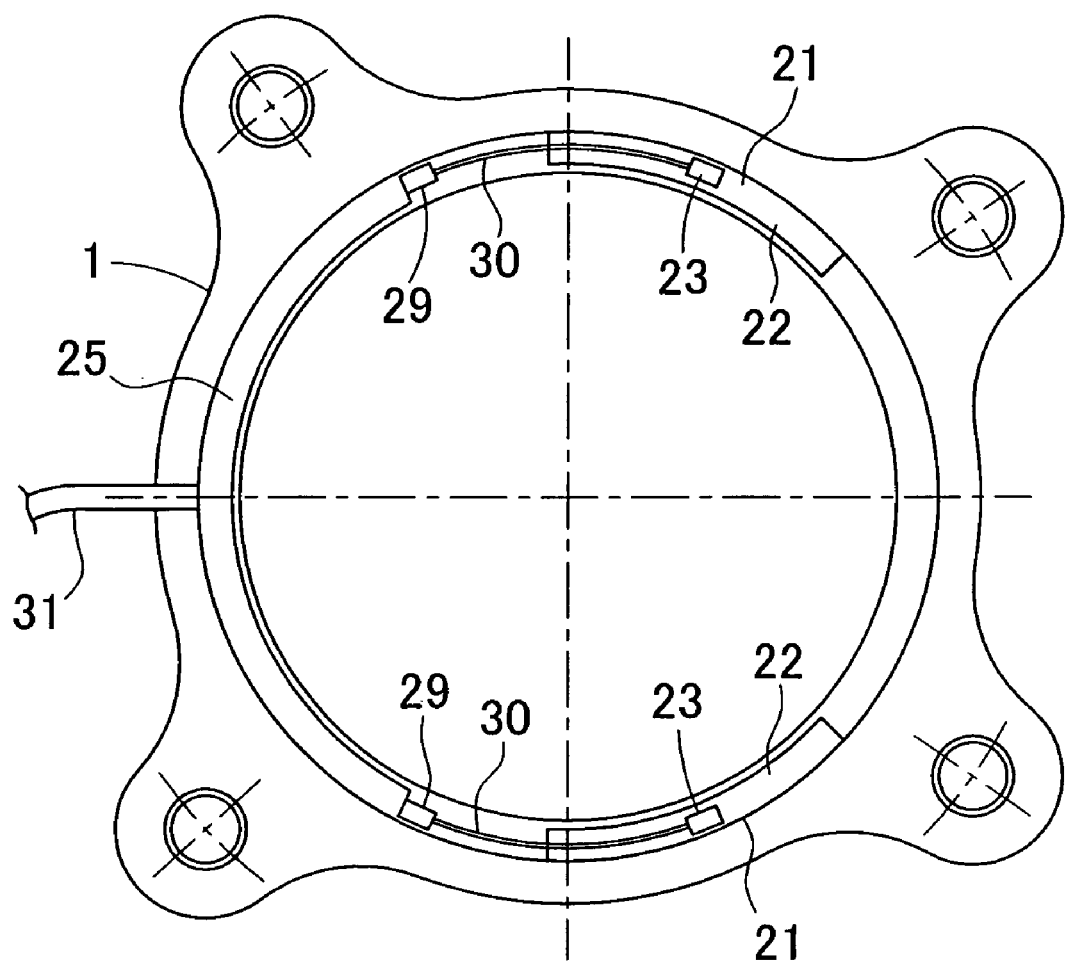
FIG. 41 is a front elevational view showing an outer member, a sensor unit and a sensor signal processing circuit unit of the bearing for the wheel.

In the fourteenth embodiment mentioned above, the sensor unit 21 and the sensor signal processing circuit unit 45 are attached to the inner periphery of the outer member 1, however, in the case that a suitable space is not provided between the outboard side raceway surface 3 in the inner peripheral surface of the outer member 1 and the sealing device 7, the sensor unit 21 and the sensor signal processing circuit unit 45 may be provided in an end surface of the outer member 1, such as a fifteenth embodiment shown in FIGS. 40 and 41. Even in this case, the sensor signal processing circuit unit 45 is provided near the sensor unit 21.

Figure 42:
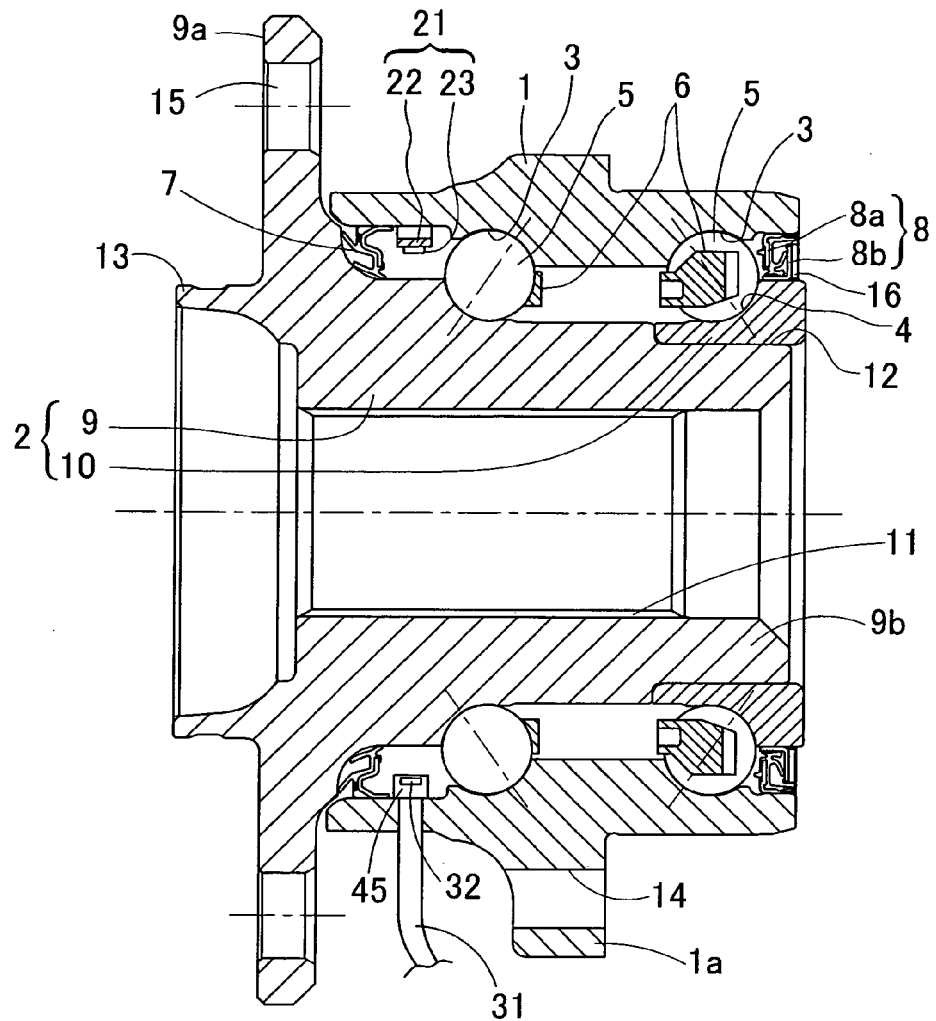
FIG. 42 is a cross sectional view of a sensor-equipped bearing for a wheel in accordance with a sixteenth embodiment of the present invention.
Figure 43:
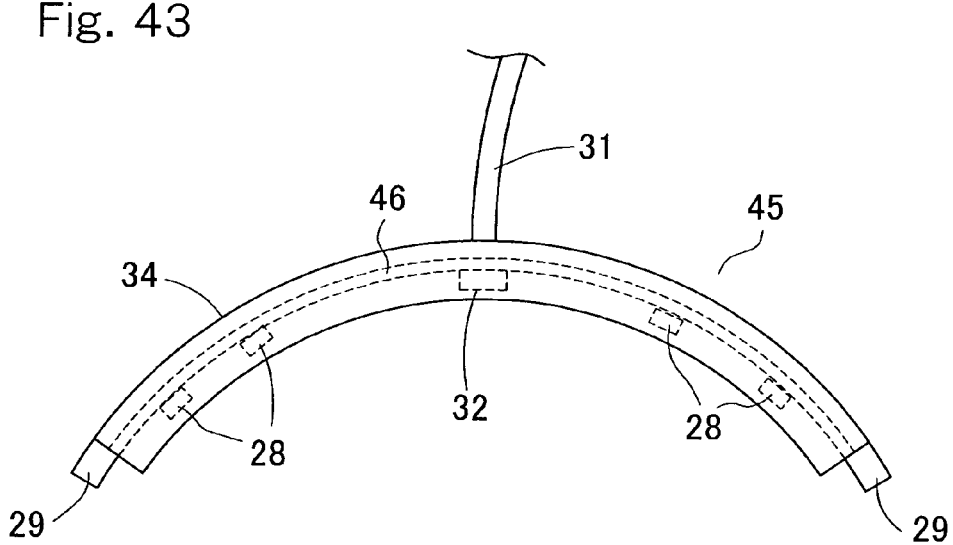
FIG. 43 is a front elevational view showing a sensor signal processing circuit unit of the sixteenth embodiment.

Next, a description will be given of a sensor-equipped bearing for a wheel in accordance with a sixteenth embodiment with reference to FIGS. 42 and 43. FIG. 42 is a cross sectional view of the sensor-equipped bearing for the wheel in accordance with the sixteenth embodiment of the present invention. FIG. 43 is a front elevational view of the sensor signal processing circuit unit 45. The sensor signal processing circuit unit 45 is provided integrally with various sensors 32 for detecting a state of the bearing for the wheel, in addition to the structure in the fourteenth embodiment. The various sensors 32 includes at least one of an acceleration sensor for detecting an acceleration of a rotation, a vibration sensor for detecting a vibration of the outer member 1, and a water ingredients detecting sensor for detecting whether or not a water ingredients exists in the annular bearing space.

Figure 44:
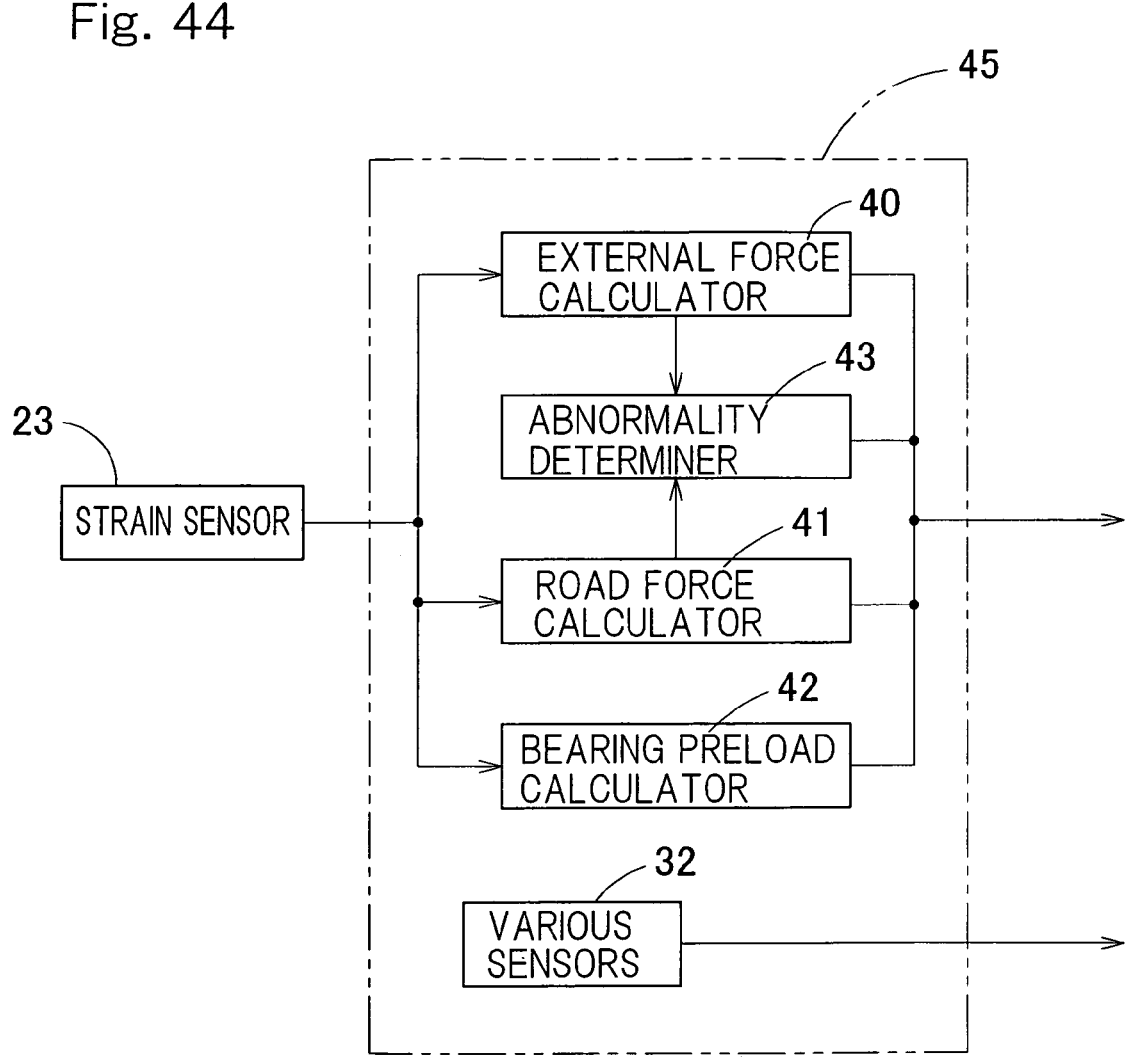
FIG. 44 is a block diagram of the sensor signal processing circuit unit.

As shown by a block diagram in FIG. 44, the sensor signal processing circuit unit 45 includes the various sensors 32 in addition to the sensor signal processing circuit having the external force calculator 40, the road surface action force calculator 41, the bearing preload amount calculator 42, and the abnormality determiner 43.

The state of the bearing for the wheel is detected by the various sensors 32. The detected state of the bearing for the wheel can be used for the vehicle control of the motor vehicle, a service life evaluation, a maintenance determination and the like. For example, in the case that the acceleration sensor is provided as the various sensors 32, it can be used for the traveling control of the motor vehicle. In the case that the vibration sensor is provided, the bearing service life can be estimated or determined on the basis of the vibration condition. In the case that the water ingredients detecting sensor is provided, it is possible to detect an amount of the water intruding into the annular bearing space through the sealing devices 7, 8, and a deterioration state of grease on the basis of the intruding water ingredients can be estimated.

As mentioned above, since the sensor signal processing circuit unit 45 is provided near the sensor unit 21, the wiring connecting the strain sensor 23 and the sensor signal processing circuit is simplified, and the wiring work can easily be carried out. Further, since the various sensors 32 (at least one of the acceleration sensor, the vibration sensor and the water ingredients detecting sensor) detecting the state of the bearing is attached to the sensor signal processing circuit unit 45, the wiring connecting the various sensors 32 and the sensor signal processing circuit unit 45 is not necessary. Further, it is possible to measure the load and the state of the bearing at one position by setting the various sensors 32 (the acceleration sensor, the vibration sensor and the water ingredients detecting sensor) in the sensor signal processing circuit unit 45. Accordingly, in comparison with the case that the sensor signal processing circuit is provided in the other portions than the bearing for the wheel, the whole of the detecting system can be made compact, and the wiring can be simplified.

Figure 45:
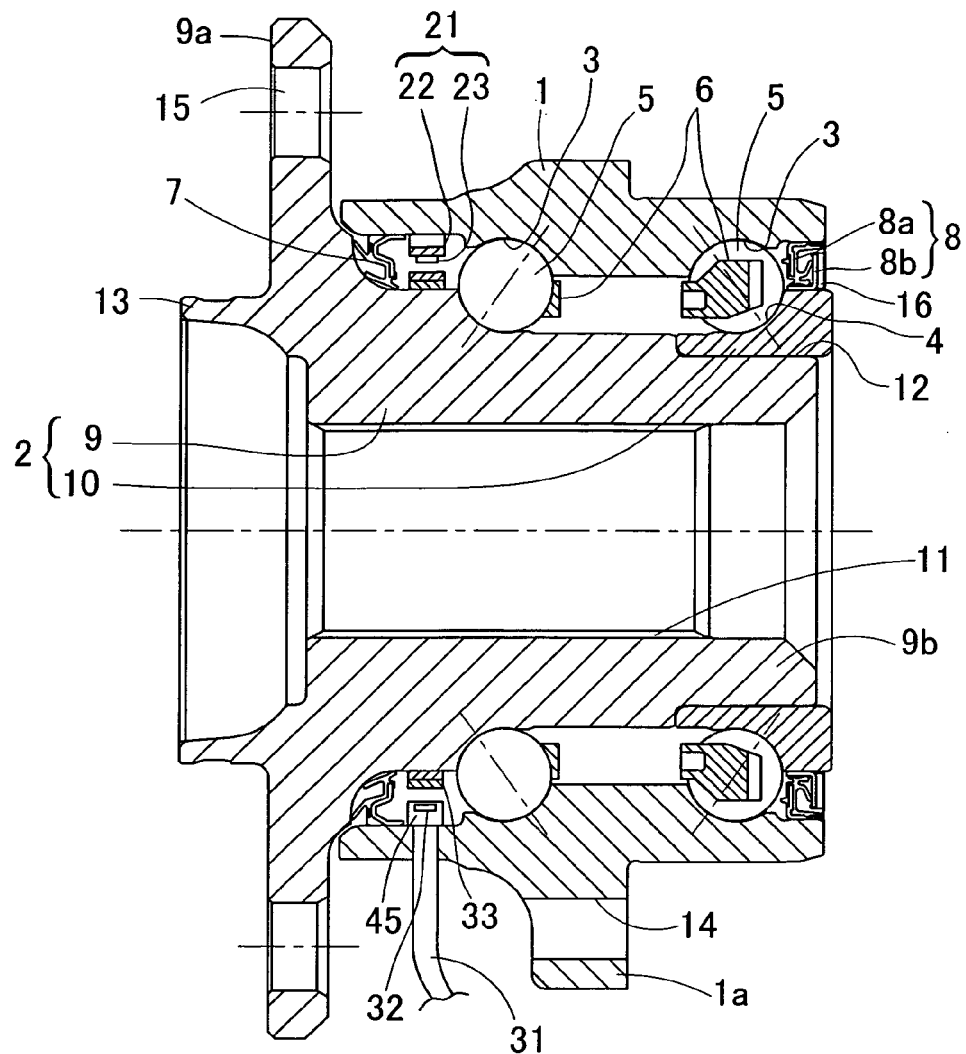
FIG. 45 is a cross sectional view of a sensor-equipped bearing for a wheel in accordance with a seventeenth embodiment of the present invention.

Further, a description will be given of a sensor-equipped bearing for a wheel in accordance with a seventeenth embodiment of the present invention with reference to FIG. 45. FIG. 45 is a cross sectional view of the sensor-equipped bearing in accordance with the seventeenth embodiment of the present invention. In the seventeenth embodiment, the sensor signal processing circuit unit 45 is further provided integrally with a magnetic sensor 32 as the various sensor. As the magnetic sensor 32, it is possible to employ, for example, a Hall element utilizing a Hall effect, a magnetic resistance element utilizing a magnetic resistance effect, and the like.

Figure 8A:
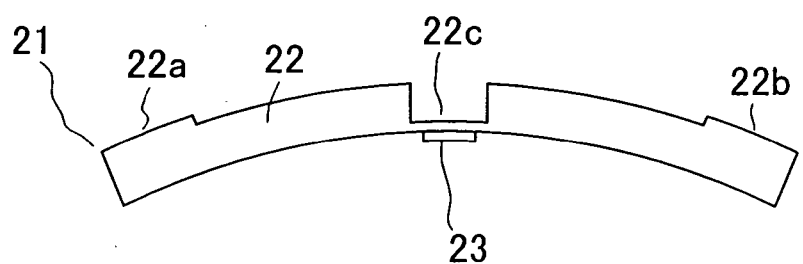
FIG. 8A is a front elevational view of the sensor unit.
Figure 8B:
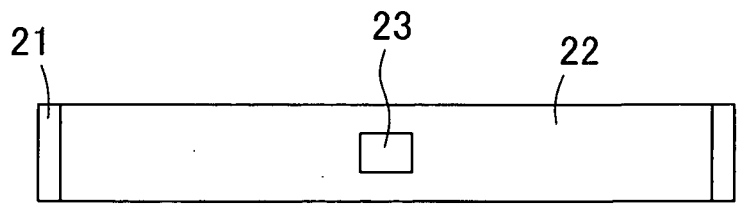
FIG. 8B is a bottom elevational view of the sensor unit.

The structure of the sensor unit 21 in the sensor-equipped bearing for the wheel in accordance with the seventeenth embodiment is the same structure as the sensor unit 21 in the third embodiment shown in FIGS. 8A and 8B.

Figure 46A:
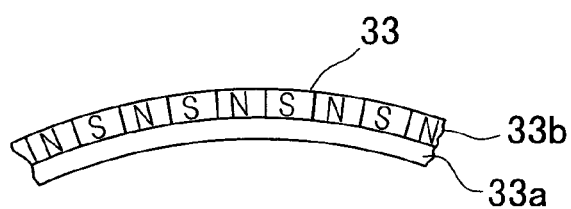
FIG. 46A is a front elevational view of a main portion of a magnetic encoder of the seventeenth embodiment.
Figure 46B:
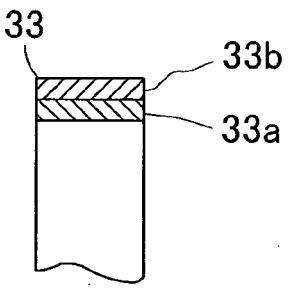
FIG. 46B is a cross sectional view of the magnetic encoder.

A magnetic encoder 33 serving as a to-be-detected portion of the magnetic sensor 32 is attached to a position opposing to the magnetic sensor 32 in the outer peripheral surface of the inner member 2. The rotation sensor is formed by the magnetic sensor 32 and the magnetic encoder 33 to define a rotation sensor. The magnetic encoder 33 includes an annular core member 33*a* made of a metal, and a multipolar magnet 33*b* such as an annular rubber magnet provided on a surface of the core member 33*a*, as shown in FIG. 46. The multipolar magnet 33*b* is magnetized in multiple poles in the circumferential direction, and magnetic poles N and S are alternately formed. The multipolar magnet 33*b* may be made of a plastic magnet or a sintered magnet in addition to the rubber magnet, or may be made of a ferrite material or the like.

Figure 47:
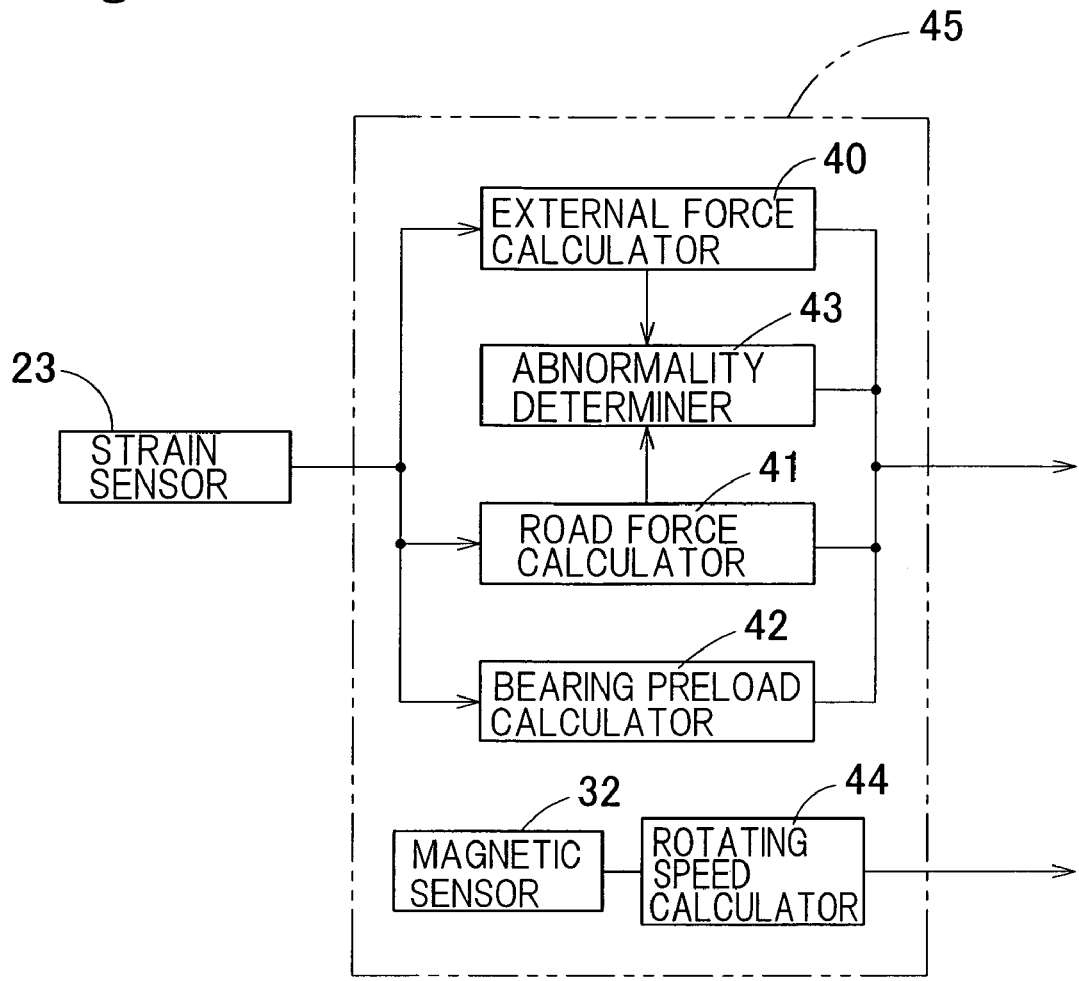
FIG. 47 is a block diagram of a sensor signal processing circuit unit of the seventeenth embodiment.

As shown by a block diagram in FIG. 47, the sensor signal processing circuit includes the external force calculator 40, the road surface action force calculator 41, the bearing preload calculator 42, the abnormality determiner 43 and a rotating speed calculator 44. Functions of these devices will be mentioned later.

When the inner member 2 is rotated in accordance with the rotation of the wheel, the magnetic encoder 33 provided in the inner member 2 is relatively moved in the circumferential direction relative to the magnetic sensor 32. The magnetic sensor 32 outputs the output signal each time when the magnetic poles N and S alternately formed in the multipolar magnet 33*b* of the magnetic encoder 33 in the circumferential direction pass the opposing position of the magnetic sensor 32 on the basis of the relative movement of the magnetic encoder 33. The output signal of the magnetic sensor 32 is sequentially transmitted to the rotating speed calculator 44. The rotating speed calculator 44 counts the number of the output signal within a unitary time, and calculates the rotating speed of the wheel, in other words, a vehicle speed on the basis of the counted number of the output signal. The rotating speed so calculated as mentioned above can be used for the vehicle control of the motor vehicle.

In the case where the magnetic sensor 32 is provided at two positions at which phase difference is not 180 degree, it is possible to detect a rotating direction in addition to the rotating speed. Even where the magnetic sensor 32 is provided at positions equal to or more than three, the rotating speed and the rotating direction can be detected.

Since it is possible to accurately detect the rotating speed of the wheel by using the multipolar magnet (the rubber magnet 33b) in which a lot of magnetic poles are arranged in the circumferential direction, such as the magnetic encoder 33 in the seventeenth embodiment, the magnetic encoder 33 may be applied to a rotation sensor particularly demanding a precision, for example, a rotation sensor used in an antilock brake system (ABS). In this case, the magnetic encoder serving as the to-be-detected portion of the magnetic sensor 32 may be structured such that one or more magnetic poles are arranged in the circumferential direction.

Figure 48:
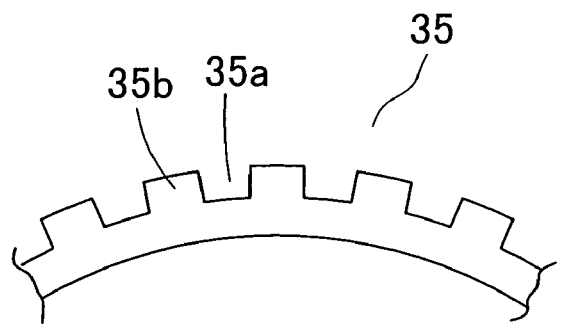
FIG. 48 is a front elevational view of a pulse ring employed as a to-be-detected employed in the seventeenth embodiment.

As the to-be-detected portion of the magnetic sensor 32, it is possible to use a toothed pulsar ring 35 made of a magnetic body ring in which concaves and convexes are provided alternatively in the circumferential direction, as shown in FIG. 48, in place of the magnetic encoder. In the case of the pulsar ring 35, the magnetic sensor 32 outputs the output signal each time when a concave portion 35a or a convex portion 35b passes through the position confronting the magnetic sensor 32.

Figure 49A:
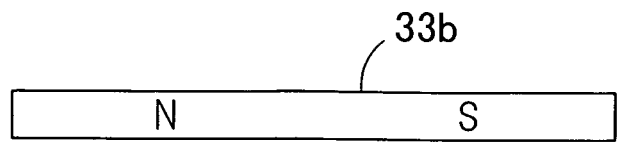
FIG. 49A is a view expressing by developing a magnet of the magnetic encoder.
Figure 49B:
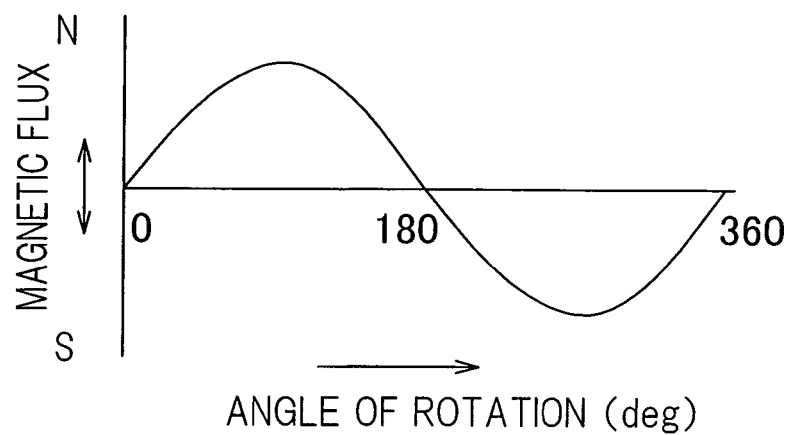
FIG. 49B is a graph showing a magnetized state of the magnet.

Further, if the rubber magnet 33b or the like of the magnetic encoder 33 is magnetized to exhibit a sine wave shape in which one rotation corresponds to one cycle, as shown in FIG. 49, a magnitude of a magnetic flux generated from a to-be-detected portion or the encoder 33 varies in accordance with an angle of rotation of the rotatable member. Accordingly, it is possible to detect an absolute angle. In this case, FIG. 49A is a view showing by developing an annular magnet 33b in a linear shape, and FIG. 49B is a graph showing a magnetized state thereof.

Figure 50:
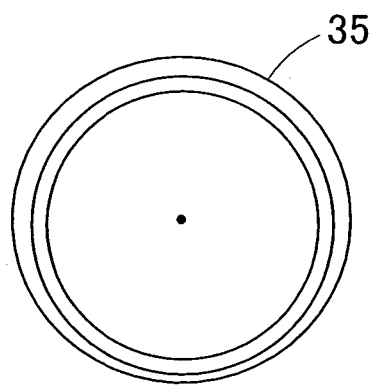
FIG. 50 is a front elevational view of another pulsar ring.

It is possible to detect an absolute angle of the wheel for the same reason as mentioned above, even by making the pulsar ring 35 eccentric with respect to an axis of rotation of the bearing for the wheel, as shown in FIG. 50.

As mentioned above, since the sensor-equipped bearing in accordance with the seventeenth embodiment is structured such that the strain sensor 23 is attached to the sensor fitting member 22 fixed to the stationary member, and the magnetic sensor 32 is attached to the sensor signal processing circuit unit 45 fixed to the stationary member in the same manner, it is possible to compactly install the load sensor and the rotation sensor in the vehicle. Also, both the load and the rotation at one position can be detected by providing the magnetic sensor 32 serving as the rotation sensor in the sensor signal processing circuit unit 45. Since each of the sensor fitting member 22 and the sensor signal processing circuit unit 45 can be formed by a simple part attached to the stationary member, it is possible to obtain an excellent mass production so as to achieve a cost reduction by attaching the strain sensor 23 and the magnetic sensor 32 to the sensor fitting member 22.

Since the sensor signal processing circuit unit 45 is provided near the sensor unit, the wiring connecting the strain sensor 23 and the sensor signal processing circuit 45 is simplified, and the wiring work is easily carried out. Further, since the magnetic sensor 32 is attached to the sensor signal processing circuit unit 45, the wiring to connect the magnetic sensor 32 and the sensor signal processing circuit unit 45 is not necessary. Accordingly, in comparison with the case in that the sensor signal processing circuit is provided in the portions other than the bearing, the whole of the detecting system can be downsized, and the wiring can be made simple.

In any of the first to seventeenth embodiments described above, the sensor fitting member 22 is formed in a shape such that no plastic deformation occurs when the conceivable maximum load is applied to the bearing.

Further, in each of the foregoing embodiments the outer member 1 serves as the stationary member, however, the present invention can be applied to the sensor-equipped bearing in which the inner member serves as the stationary member. In this case, the sensor fitting member is attached to a peripheral surface forming the outer periphery or the inner periphery of the inner member.

Further, each of the embodiments is described in the case of being applied to the third generation model bearing for the wheel, however, the present invention can be applied to a first or second generation model bearing for a wheel in which the bearing portion and the hub form the parts independent to each other, and a fourth generation model bearing for a wheel in which a part of the inner member is formed by an outer race of a constant velocity joint. Further, the sensor-equipped bearing can be applied to a bearing for a driven wheel, and can be applied to a bearing for a wheel of a taper roller type of each of generations.

The foregoing embodiments include preferable aspects set out below.

In accordance with the basic construction underling the embodiments of the present invention, the sensor-equipped bearing for the wheel includes an outer member provided with a double-row raceway surface on an inner periphery thereof; an inner member provided with raceway surfaces opposing to the raceway surfaces of the outer member, one of the outer and inner members serving as a stationary member; double-row rolling elements interposed between the outer and inner raceway surfaces; a sensor fitting member fixed to a peripheral surface of the stationary member; and a plurality of strain sensors attached to the sensor fitting member for measuring a strain thereof. For example, in the case that the outer member serves as the stationary member and the inner member serves as the rotatable member, the sensor fitting member is attached to the outer member.

[First Aspect Group]

The sensor-equipped bearing in the first aspect group of the present invention is structured such that in the basic construction mentioned above, the sensor fitting member is not plastically deformed at a time of being press-fitted to the stationary member. In particular, the ring member is not plastically deformed or the gap between the ring member the stationary member is not generated, even when the conceivable maximum value of the external force is applied to the bearing, or the action force between the tire and the road surface.

With this construction, the deformation of the stationary member is accurately transmitted to the sensor fitting member, and as a result, the strain of the stationary member can accurately be detected with a good precision.

The adhesive agent may be used for fixing the stationary member and the sensor fitting member, and the bolt may be used for this fixation. When the elements are fixed by concomitantly using the adhesive agent and the bolt, it is possible to avoid the generation of the gap between the sensor fitting member and the stationary member, and as a result, the deformation of the stationary member can more accurately be transmitted to the sensor fitting member. Therefore, the strain of the stationary member can be more precisely detected.

There can be provided with the abnormality determiner for determining whether or not the external force applied to the bearing or the action force between the tire and the road surface exceeds the predetermined tolerance value and outputting the abnormality signal in the case of determining that it exceeds the predetermined tolerance value. With this construction, it is possible to more suitably carry out the travel posture control or the like of the motor vehicle.

[Second Aspect Group]

The sensor-equipped bearing included in the second aspect group of the present invention is structured such that in the basic construction mentioned above, the stationary member is provided with a sensor unit having the sensor fitting member and the strain sensor attached thereto, the sensor fitting member having at least two contact fixing portions fixed to the stationary member and at least one cut-off portion between the neighboring contact fixing portions, the strain sensor being attached to the cut-off portion.

The first contact fixing portion of the contact fixing portions of the sensor fitting member is preferably attached to a position at which the deformation in the radial direction is significant in comparison with any other positions of the stationary member, induced by the external force applied to the stationary member or the action force between the tire and the road surface. The deformation of the stationary member in the radial direction caused by the external force or the action force is varied in accordance with the position in the circumferential direction. According to a result of the analysis, the deformation in the radial direction of the stationary member caused by the load in the axial direction applied to the contact point between the tire and the road surface becomes largest at nearest side and farthest side with respect to the road surface side and the road surface side, that is, a top position and a bottom position in the vertical direction in the stationary member. Where the first contact fixing portion is fixed to the position at which deformation in the radial direction may be observed more largely than any other positions in the stationary member, the second contact fixing portion at which a smaller deformation is generated acts as a supporting point, and as a result, the largest deformation appears at the first contact fixing portion due to the deformation of the stationary member. Accordingly, at the sensor-arranged position in the sensor fitting member, a still larger strain is generated, and as a result, the strain of the stationary member can more sensitively be detected.

Further, the contact fixing portions may be fixed to positions at which the direction of the strain in the radial direction caused by the external force applied to the stationary member or the action force between the tire and the road surface are inverted to each other.

When the first and second contact fixing portions are fixed at the positions at which the directions of the strain in the radial direction of the stationary member are inversely different from each other, large deformation of the stationary member is transmitted to the sensor fitting member due to the summation of the deformation of both the fixing portions, thereby increasing the strain to be detected. Accordingly, the strain of the stationary member can be detected with a better sensitivity.

The sensor units may be provided at a plurality of positions. With a plurality of the strain sensors, the strains at a plurality of positions of the stationary member are detected by the strain sensors and the load or the like applied to the wheel is detected from the output of a plurality of strain sensors. Accordingly, a detecting precision of the load or the like applied to the wheel is improved.

The sensor unit is disposed at the outboard side position than the outboard raceway surface in the stationary member. In accordance with the result of the analysis and the experiment, only the outboard side portion of the stationary member has the positive and negative directionalities in the strain on the basis of the directions of the load such as the external force or the action force, in both of the strains in the radial and circumferential directions of the stationary member. Accordingly, in order to detect the directions of the load, it is recommendable to arrange the sensor unit at the position in the outboard side in the stationary member.

The sensor unit is attached to the peripheral surface of the stationary member. The sensor unit may be attached to one of the peripheral surface and an end surface of the stationary member, however, in the case that the sensor unit is attached to the peripheral surface, the deformation of the stationary member tends to be accurately transmitted to the sensor fitting member, and as a result, the strain of the stationary member can sensitively be detected.

In the case that the sensor unit is attached to the inner peripheral surface of the stationary member, a sealing device for sealing the annular bearing space between the outer member and the inner member is preferably provided on the outboard side of the sensor unit.

If the sealing device for sealing the bearing space is provided closer to the outboard side than the sensor unit in the case of attaching the sensor unit to the peripheral surface in the inner peripheral side of the stationary member, the sensor unit is not affected by the muddy water or the like, and it is unnecessary to provide the sealing device exclusive dedicated to the sensor unit.

The sensor fitting member may not be plastically deformed when the conceivable maximum value of the external force is applied to the bearing or the action force between the tire and the road surface.

If the plastic deformation is generated, the deformation of the stationary member is not accurately transmitted to the sensor fitting member so as to affect the measurement of the strain. In contrast thereto, when the sensor fitting member is not plastically deformed at the conceivable maximum value of the external force or the action force, the deformation of the stationary member is accurately transmitted to the sensor fitting member, and as a result, the strain of the stationary member can accurately be detected.

[Third Aspect Group]

The sensor-equipped bearing according to the third aspect group of the present invention is structured such that in the basic construction mentioned above, the stationary member is provided with a weakened portion in the vicinity of an end portion thereof and wherein a sensor unit having the sensor fitting member and the strain sensor is attached to the weakened portion, the sensor fitting member having at least two contact fixing portions fixed to the stationary member and at least one cut-off portion between the neighboring contact fixing portions, the strain sensor being attached to the cut-off portion.

A circumferential groove may be employed in the stationary member to define the weakened portion with the sensor fitted to unit the groove. The weakened portion formed by the groove is easily worked, and the rigidity thereof can be reduced without adversely affecting the supporting stiffness of the tire. Since the weakened portion is not limited particularly in the shape so long as it satisfies the requirement that the rigidity thereof is lower than the surrounding portion, the other shapes or configurations than the circumferential groove and the groove in the axial direction may be employed.

[Fourth Aspect Group]

The sensor-equipped bearing according to the fourth aspect group of the present invention is structured such that in the basic construction mentioned above, the stationary member is provided with a sensor unit having the sensor fitting member and the strain sensor attached thereto, the sensor fitting member having at least two contact fixing portions fixed to the stationary member and at least one cut-off portion between the neighboring contact fixing portions, the strain sensor being attached to the cut-off portion and wherein a portion between the contact fixing portions of the sensor fitting member includes two flat plates parallel to each other and a arcuate plate connecting the flat plates together, each flat plate having the cut-off portion.

When the sensor fitting member is constituted by the press molded product and two parallel flat plates and the arcuate plate integrally with each other, it is possible to reduce the working step thereby manufacturing the sensor fitting member inexpensively.

A reinforcing member may be bonded to portions other than the cut-off portion of the flat plate in the sensor fitting member. With this reinforcing member, it is possible to further increase the rigidity of the whole of the sensor fitting member while keeping the rigidity at the position of the cut-off portion low.

[Fifth Aspect Group]

The sensor-equipped bearing according to the fifth aspect group of the present invention is structured such that in the basic construction mentioned above, the stationary member is provided with a sensor unit having the sensor fitting member and the strain sensor attached thereto, the sensor unit being attached to a surface of the stationary member, which surface confronts the other of the outer and inner members and wherein the sensor unit is provided with a sacrificial anode.

The sacrificial anode may be formed as a film provided on the sensor fitting member. In this case, the film may be provided by means of plating.

According to this feature, since the sensor fitting member is covered with the film of the sacrificial anode, corrosion of the strain sensor can be prevented.

Further, since the strain sensor is placed adjacent the sacrificial anode, corrosion of the strain sensor can effectively be prevented. By means of plating technology, the film can easily be obtained.

Preferably, that the sacrificial anode is made of a zinc or a zinc alloy. Since the zinc or the zinc alloy has the high ionization tendency, under the corrosive environment the zinc or the zinc alloy itself is preferentially ionized so as to be eluted thereby preventing the peripheral parts from being ionized, that is, being eluted. Accordingly, if the sacrificial anode is made of the zinc or the zinc alloy, it is possible to effectively prevent the sensor unit from being corroded in the case that the water or the salty liquid intrudes into the annular bearing space.

The sacrificial anode is made of the material which has the high ionization tendency, that is, tends to be corroded, an aluminum, a magnesium or an alloy thereof instead of the zinc may be chosen depending on the environment.

Further, the sacrificial anode may be formed by a bulk material. In other words, the sensor fitting member should not necessarily be covered with the sacrificial anode, but the separate sacrificial anode member may be attached to an arbitrary part of the sensor fitting member. For example, the zinc, the zinc alloy or the like can be used as the bulk material.

[Sixth Aspect Group]

The sensor-equipped bearing according to the sixth aspect group of the present invention is structured such that to the basic structure mentioned above, the stationary member is provided with a sensor unit having the sensor fitting member and the strain sensor attached thereto, the sensor fitting member having at least two contact fixing portions fixed to the stationary member and at least one cut-off portion between the neighboring contact fixing portions, the strain sensor being attached to the cut-off portion and wherein a sensor signal processing circuit unit having a sensor signal processing circuit for processing an output signal of the strain sensor is provided on the stationary member in the vicinity of the sensor unit.

The sensor unit and the sensor signal processing circuit unit may be attached to the peripheral surface of the stationary member. Alternatively, the sensor unit and the sensor signal processing circuit unit may be attached to the end surface of the stationary member.

In the case that the sensor unit and the sensor signal processing circuit unit are provided on the peripheral surface of the stationary member, particularly on the peripheral surface thereof confronting the rotatable member, since the end portion of the annular bearing space between the outer and inner members is, in general, sealed by a sealing device, the sensor unit and the sensor signal processing circuit unit are disposed in the sealed annular bearing space, both the units are not affected by the muddy water or the like. If there is no space for providing the sensor unit and the sensor signal processing circuit unit in the annular bearing space, the sensor unit and the sensor signal processing circuit unit may be attached to the end surface of the stationary member.

It is preferable that the sensor unit is disposed at the position on the outboard side of the raceway surface of the stationary member. In general, the bearing is structured such that the stationary member has an extension portion on the outboard side of the raceway surface, and the sealing device is provided between the extension portion and the rotational member. Accordingly, by disposing the sensor unit on the outboard side of the outboard side raceway surface in the stationary member, the sensor unit and the sensor signal processing circuit unit adjacent to the sensor unit can be provided in the sealed annular bearing space. Further, since the strain of the stationary member appears greatly in the extension portion of the stationary member in comparison with the other positions, it is possible to precisely detect the strain by the strain sensor attached to the extension portion.

[Seventh Aspect Group]

The sensor-equipped bearing according to the seventh aspect group of the present invention is structured such that in the basic construction mentioned above, the stationary member is provided with a sensor unit having the sensor fitting member and the strain sensor attached thereto, the sensor fitting member having at least two contact fixing portions fixed to the stationary member and at least one cut-off portion between the neighboring contact fixing portions, the strain sensor being attached to the cut-off portion and wherein a sensor signal processing circuit unit for processing an output signal of the strain sensor is provided on the stationary member in the vicinity of the sensor unit, the sensor signal processing circuit unit having at least one of an acceleration sensor, a vibration sensor and a water ingredients detecting sensor.

[Eighth Aspect Group]

The sensor-equipped bearing according to the eighth aspect group of the present invention is structured such that in the basic construction mentioned above, the stationary member is provided with a sensor unit having the sensor fitting member and the strain sensor attached thereto, the sensor fitting member having at least two contact fixing portions fixed to the stationary member and at least one cut-off portion between the neighboring contact fixing portions, the strain sensor being attached to the cut-off portion and wherein a sensor signal processing circuit unit for processing an output signal of the strain sensor is provided on the stationary member in the vicinity of the sensor unit, the sensor signal processing circuit unit having a magnetic sensor and wherein a to-be-detected portion made of magnetic material for detecting a rotation is provided on the other member of the outer and inner members serving as a rotational member at a position confronting the magnetic sensor.

The magnetic sensor may be a sensor utilizing the Hall effect or a sensor utilizing the magnetic resistance effect.

The to-be-detected portion is formed, for example, the magnetic encoder in which at least one magnetic pole is arranged at least in the circumferential direction. Alternatively, the to-be-detected portion may have at least one concavity and convexity arranged in the circumferential direction.

Also, the to-be-detected portion may have a concentric shape with respect to the center axis of the rotation of the rotatable member. With this feature, since the magnetic flux which the to-be-detected portion generates and acts on the magnetic sensor varies in accordance with the angle of rotation of the rotatable member, the absolute angle of the bearing can be detected.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A sensor-equipped bearing for a wheel rotatably supporting the wheel relative to a vehicle body comprising:
   an outer member provided with a double-row raceway surface on an inner periphery thereof;
   an inner member provided with raceway surfaces opposing to the raceway surfaces of the outer member, one of the outer and inner members serving as a stationary member;
   double-row rolling elements interposed between the outer and inner raceway surfaces; and
   a sensor unit provided on the stationary member, and having a sensor fitting member fixed to a peripheral surface of the stationary member, and a plurality of strain sensors attached to the sensor fitting member for measuring a strain thereof, the sensor fitting member having at least two contact fixing portions fixed to the stationary member and at least one cut-off portion between the neighboring contact fixing portions, the strain sensor being attached to the cut-off portion, the sensor fitting member being formed as an approximately circular arc shape of the stationary member, the sensor fitting member being formed with the contact fixing portions protruding radially from the circular arc,
   wherein there exists a gap between the positions other than the contact fixing portions of the sensor fitting member and the inner peripheral surface of the stationary member, and
   wherein the cut-off portion has a lower rigidity than other portions of the sensor fitting member, so that a strain greater than the strain of the stationary member is generated in the sensor fitting member.

2. The sensor-equipped bearing as claimed in claim 1, wherein the stationary member is provided with a weakened portion in the vicinity of an end portion thereof, the strain sensor being attached to the cut-off portion.

3. The sensor-equipped bearing as claimed in claim 1, wherein a portion between the contact fixing portions of the sensor fitting member includes two flat plates parallel to each other and a arcuate plate connecting the flat plates together, each flat plate having the cut-off portion.

4. The sensor-equipped bearing as claimed in claim 1, wherein the sensor unit is attached to a surface of the stationary member, which surface confronts the other of the outer and inner members and wherein the sensor unit is provided with a sacrificial anode.

5. The sensor-equipped bearing as claimed in claim 1, further comprising a sensor signal processing circuit unit provided on the stationary member in the vicinity of the sensor unit and having a sensor signal processing circuit for processing an output signal of the strain sensor.

6. The sensor-equipped bearing as claimed in claim 1, further comprising a sensor signal processing circuit unit for processing an output signal of the strain sensor, the sensor signal processing circuit unit being provided on the stationary member in the vicinity of the sensor unit and having at least one of an acceleration sensor, a vibration sensor and a water ingredients detecting sensor.

7. The sensor-equipped bearing as claimed in claim 1, further comprising; a sensor signal processing circuit unit for processing an output signal of the strain sensor, the sensor signal processing circuit unit being provided on the stationary member in the vicinity of the sensor unit and having a magnetic sensor; and
   a to-be-detected portion made of magnetic material for detecting a rotation and provided on the other member of the outer and inner members serving as a rotational member at a position confronting the magnetic sensor.

8. The sensor-equipped bearing as claimed in claim 1, wherein the cut-off portion is a groove or a notch.

* * * * *

UNITED STATES PATENT AND TRADEMARK OFFICE
CERTIFICATE OF CORRECTION

PATENT NO. : 8,167,497 B2
APPLICATION NO. : 11/990071
DATED : May 1, 2012
INVENTOR(S) : Takayoshi Ozaki et al.

It is certified that error appears in the above-identified patent and that said Letters Patent is hereby corrected as shown below:

On the Title Page

First Page Col. 1 (Foreign Applications); Under Item (30) Foreign Application Priority Data, insert
-- JAPAN 2005-229211 08/08/2005
JAPAN 2005-240908 08/23/2005
JAPAN 2005-240909 08/23/2005
JAPAN 2005-240910 08/23/2005
JAPAN 2005-240911 08/23/2005
JAPAN 2005-240912 08/23/2005
JAPAN 2005-250576 08/31/2005
JAPAN 2005-250577 08/31/2005 --

Signed and Sealed this
Twenty-fifth Day of March, 2014

Michelle K. Lee
*Deputy Director of the United States Patent and Trademark Office*